(12) United States Patent
Sato

(10) Patent No.: US 11,363,829 B2
(45) Date of Patent: Jun. 21, 2022

(54) PRESSURIZATION PROCESSING SYSTEM

(71) Applicant: IDEAL BRAIN CO., LTD., Tokyo (JP)

(72) Inventor: Takanori Sato, Tokyo (JP)

(73) Assignee: Ideal Brain Co., Ltd., Tokyo (JP)

( * ) Notice: Subject to any disclaimer, the term of this patent is extended or adjusted under 35 U.S.C. 154(b) by 451 days.

(21) Appl. No.: 16/696,322

(22) Filed: Nov. 26, 2019

(65) Prior Publication Data

US 2020/0170284 A1 Jun. 4, 2020

(30) Foreign Application Priority Data

Dec. 4, 2018 (JP) .............................. JP2018-227450
Apr. 18, 2019 (JP) .............................. JP2019-079441

(51) Int. Cl.
| | | |
|---|---|---|
| *A23L 3/015* | (2006.01) | |
| *B63B 22/24* | (2006.01) | |
| *B63B 22/04* | (2006.01) | |
| *B63B 22/06* | (2006.01) | |

(52) U.S. Cl.
CPC ............ *A23L 3/0155* (2013.01); *B63B 22/04* (2013.01); *B63B 22/06* (2013.01); *B63B 22/24* (2013.01); *A23V 2002/00* (2013.01); *B63B 2211/00* (2013.01)

(58) Field of Classification Search
CPC ......... B63B 22/04; B63B 22/06; B63B 22/24; B63B 2211/00; B63B 22/003; A23L 3/0155; A23V 2002/00
USPC .............................................. 441/32; 99/467
See application file for complete search history.

(56) References Cited

U.S. PATENT DOCUMENTS

| | | | |
|---|---|---|---|
| 3,889,307 A | | 6/1975 | Houot |
| 4,685,742 A | | 8/1987 | Moreau |
| 4,927,396 A | * | 5/1990 | Wood .................... B63B 22/003 367/5 |
| 5,073,136 A | * | 12/1991 | DeWitt ................. B63B 22/003 441/32 |

(Continued)

FOREIGN PATENT DOCUMENTS

| | | |
|---|---|---|
| EP | 1 334 662 A1 | 8/2003 |
| JP | 2002-125586 A | 5/2002 |
| JP | 2010-018171 A | 1/2010 |

OTHER PUBLICATIONS

Extended European search report dated May 6, 2020 in the corresponding EP Patent Application No. 19212480.8.

*Primary Examiner* — Daniel V Venne
(74) *Attorney, Agent, or Firm* — Carrier Blackman & Associates, P.C.; Joseph P. Carrier; William D. Blackman

(57) ABSTRACT

A pressurization processing system that performs pressurization processing on a target by immersing the target in the sea or a lake, includes a housing body that is configured to house the target, a buoyancy body that is configured to float the housing body, a weight body that has a specific gravity greater than that of seawater or lake water, and a separation mechanism that separably connects the housing body and the weight body. In the system, the buoyancy body includes a housing bag having water permeability, and the housing bag houses a plurality of hollow glass spheres, and is immersed in the seawater or the lake water so that a space between the plurality of hollow glass spheres housed in the housing bag is filled with the seawater or the lake water.

6 Claims, 27 Drawing Sheets

(56) References Cited

U.S. PATENT DOCUMENTS

2004/0028788 A1    2/2004   Omoto
2008/0050507 A1    2/2008   Jaehnert

* cited by examiner

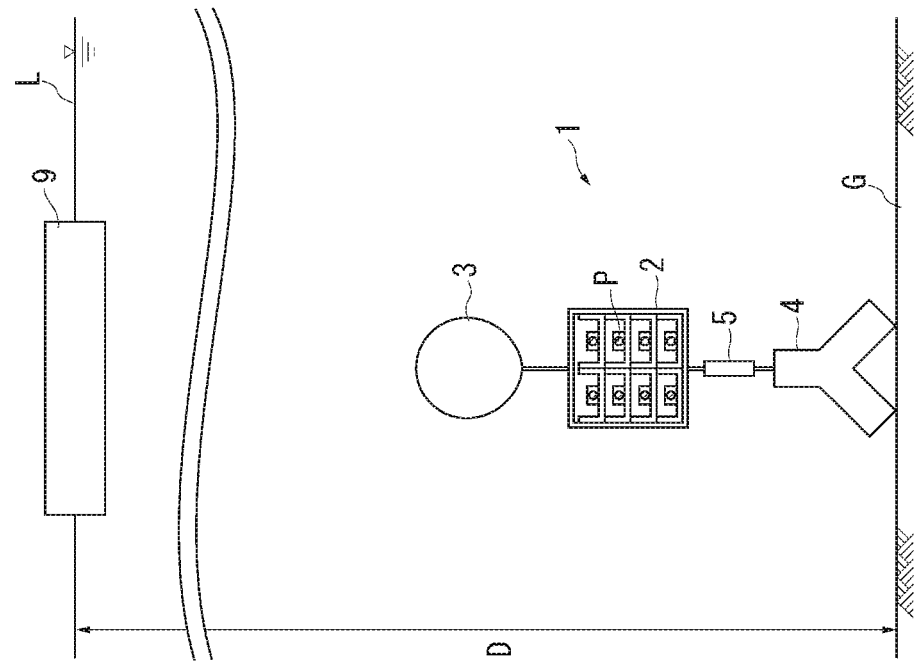
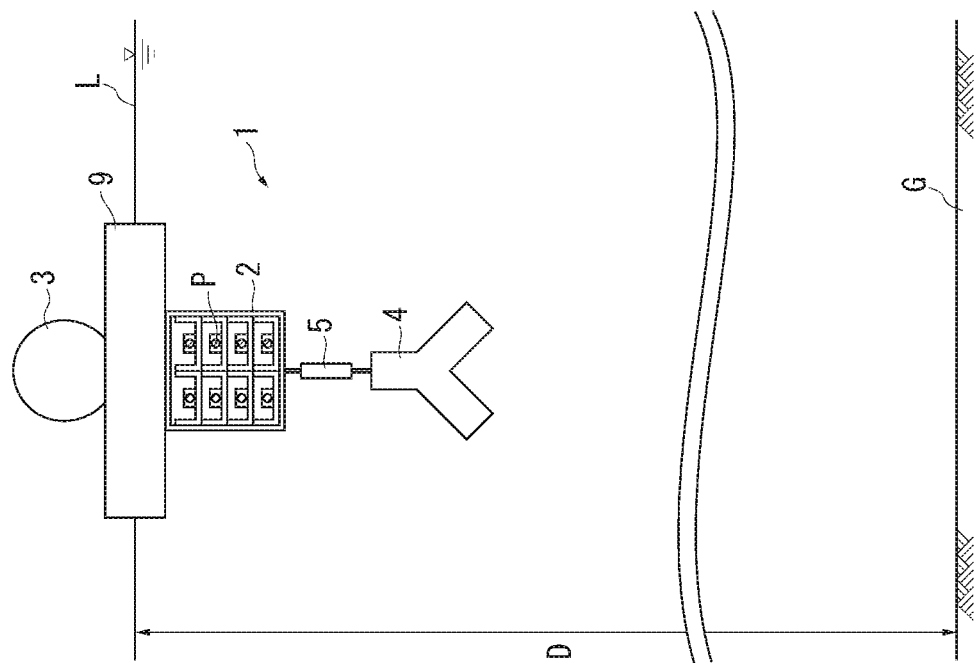

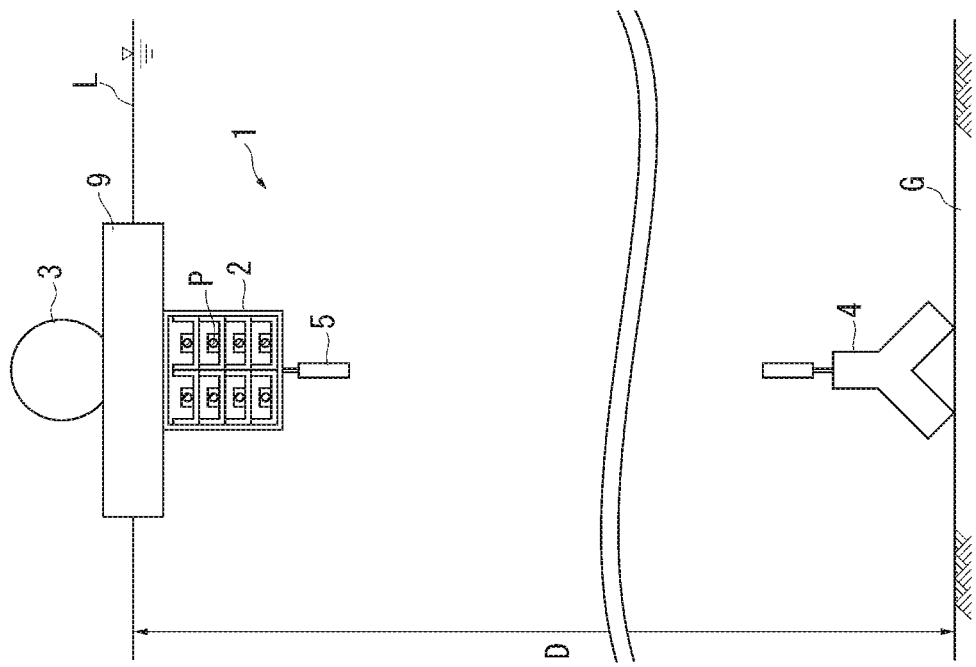
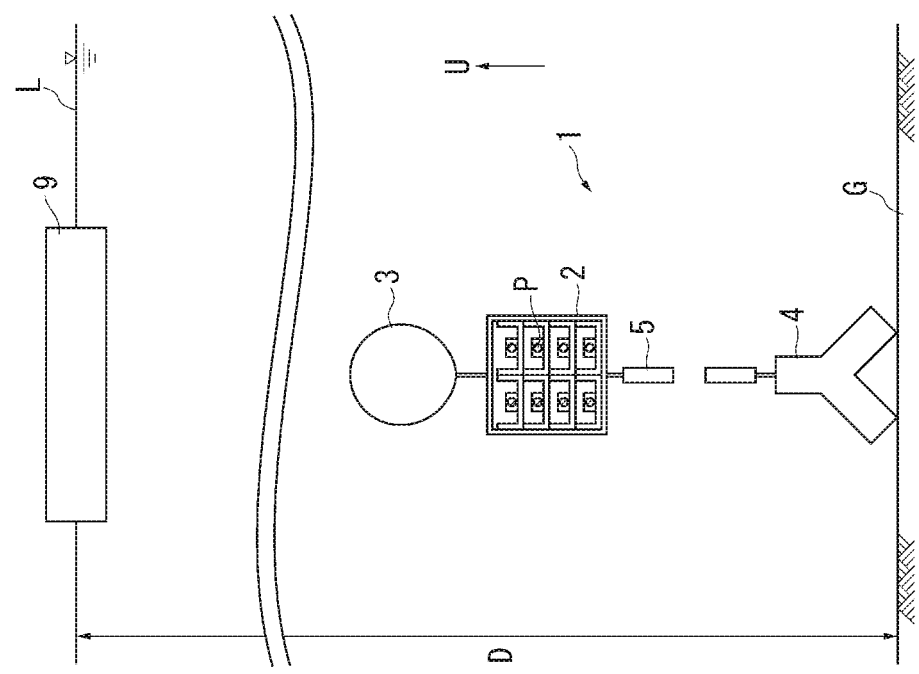

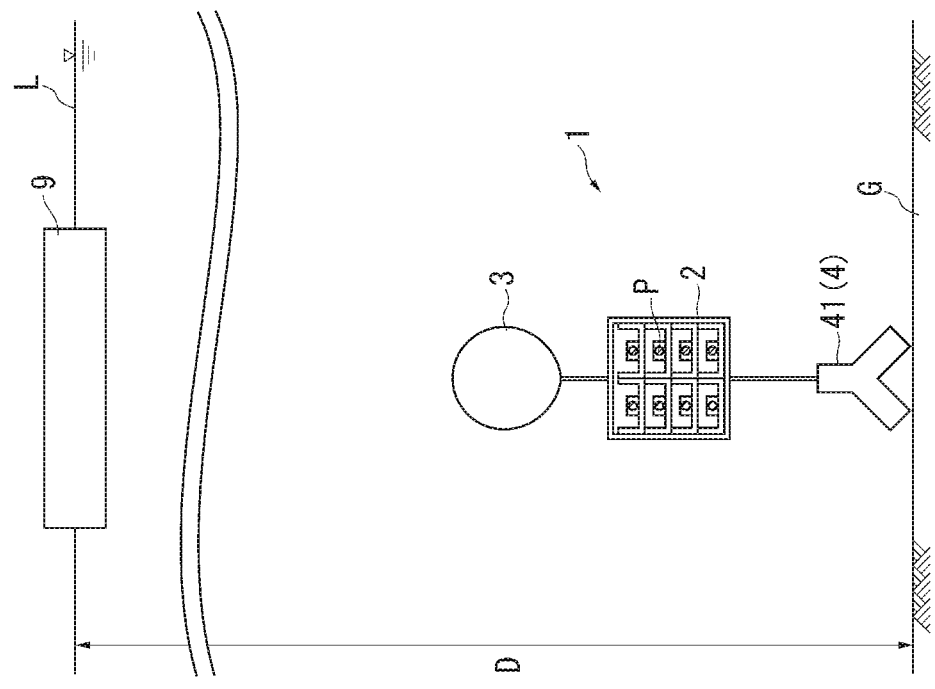
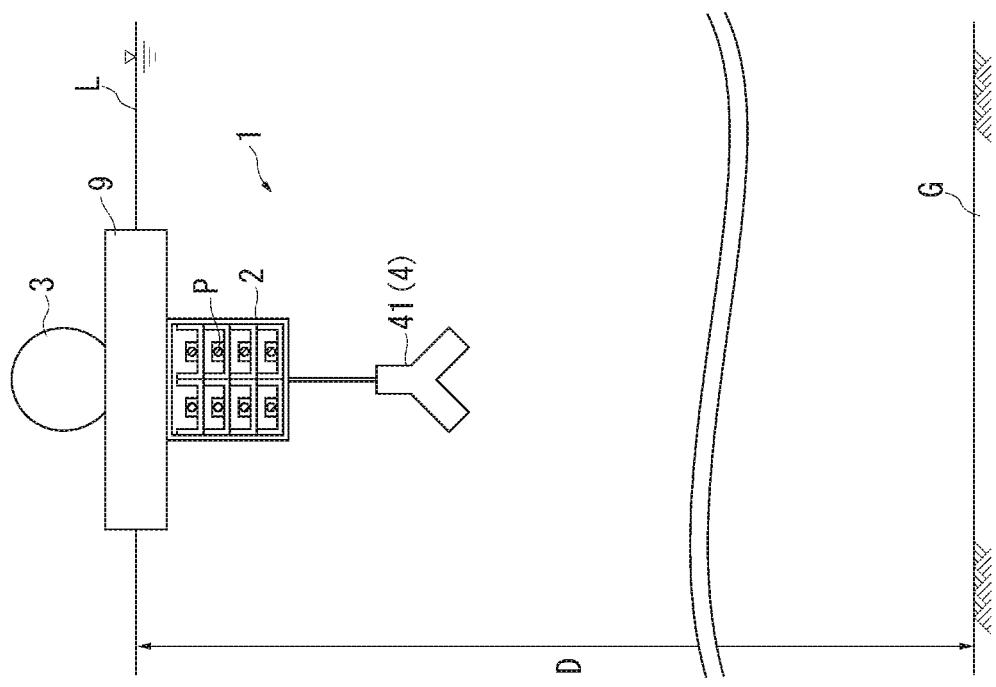

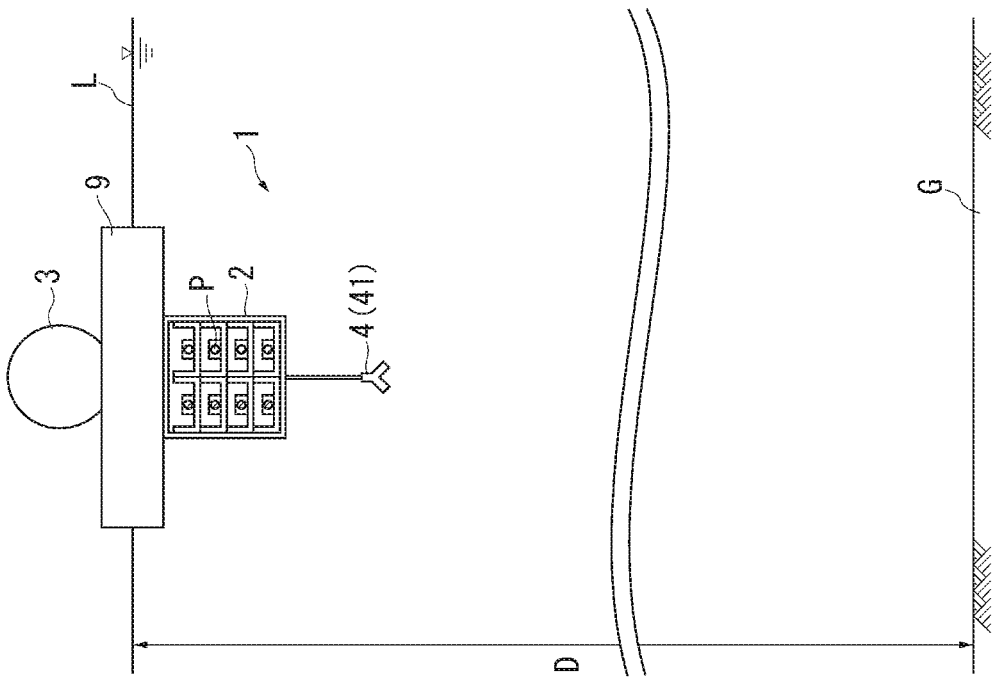
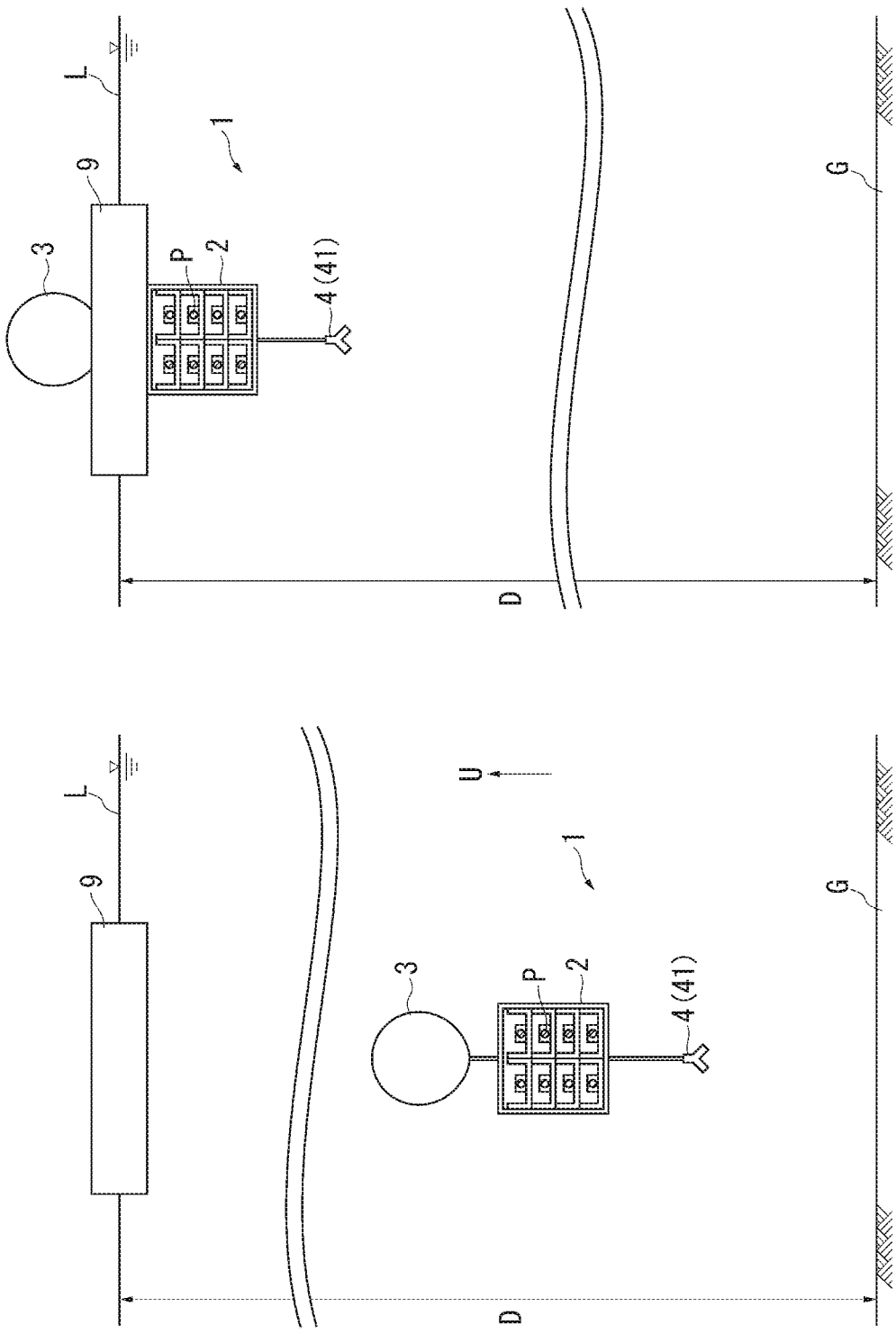

PRESSURIZATION PROCESSING SYSTEM

TECHNICAL FIELD

The present disclosure relates to a pressurization processing system that performs pressurization processing on a target by immersing the target in the sea or a lake.

BACKGROUND ART

In a related art, proposed is a method of manufacturing food using a deep seawater layer disclosed in JP-A-2002-125586 by taking advantage of a high pressure and low temperature characteristic of the deep seawater layer for the purpose of manufacturing a tasty and nutritious new food at a low cost.

The method of manufacturing food disclosed in JP-A-2002-125586 is a method of manufacturing a new food product that retains a flavor closed to that of raw food and has little loss of nutrients by including a step of keeping a food material in the deep seawater layer having a low temperature and high pressure environment for a predetermined time.

However, in a method of manufacturing food disclosed in JP-A-2002-125586, there is a problem that although food sealed in a bag is pulled up from the sea by a rope, human labor is expensive at the time of pulling up the food enclosed in the bag, and a target immersed in the sea cannot be easily collected.

The present disclosure has been made in consideration of the above-described problems, and an object thereof is to provide a pressurization processing system not only capable of performing pressurization processing on a target by immersing the target in the sea, but also capable of easily collecting the target immersed in the sea.

SUMMARY OF INVENTION

According to an aspect of the disclosure, a pressurization processing system that performs pressurization processing on a target by immersing the target in the sea or a lake, includes a housing body that is configured to house the target, a buoyancy body that is configured to float the housing body, a weight body that has a specific gravity greater than that of seawater or lake water, and a separation mechanism that separably connects the housing body and the weight body. In the system, the buoyancy body includes a housing bag having water permeability, and the housing bag houses a plurality of hollow glass spheres, and is immersed in the seawater or the lake water so that a space between the plurality of hollow glass spheres housed in the housing bag is filled with the seawater or the lake water.

According to another aspect of the disclosure, a pressurization processing system that performs pressurization processing on a target by immersing the target in the sea or a lake, includes a housing body that is configured to house the target, a buoyancy body that is configured to float the housing body, a weight body that has a specific gravity greater than that of seawater or lake water, and a separation mechanism that separably connects the housing body and the weight body. In the system, the buoyancy body includes a single layer housing bag having water permeability, and the housing bag houses a plurality of hollow glass spheres, and is immersed in the seawater or the lake water so that a space between the plurality of hollow glass spheres housed in the housing bag is filled with the seawater or the lake water.

According to another aspect of the disclosure, a pressurization processing system that performs pressurization processing on a target by immersing the target in the sea or a lake, includes a housing body that is configured to house the target, a buoyancy body that is configured to float the housing body, and a weight body that has a specific gravity greater than that of seawater or lake water. In the system, the buoyancy body includes a first housing bag in which a plurality of hollow glass spheres are housed, and a second housing bag in which the first housing bag is housed.

According to the present disclosure including the above-described configuration, it is possible to easily collect the target immersed in the sea or the lake.

BRIEF DESCRIPTION OF DRAWINGS

FIGS. 10A and 10B are schematic views illustrating the pressurization processing system according to the first embodiment when settling in the sea;

FIGS. 11A and 11B are schematic views illustrating the pressurization processing system according to the first embodiment when floating;

FIGS. 24A and 24B are schematic views illustrating a pressurization processing system according to a second embodiment when settling in the sea;

FIGS. 25A and 25B are schematic views illustrating the pressurization processing system according to the second embodiment when floating;

DESCRIPTION OF EMBODIMENTS

Hereinafter, an embodiment for performing a pressurization processing system 1 to which the present disclosure is applied will be described in detail with reference to the drawings.

First Embodiment

Figure 1:
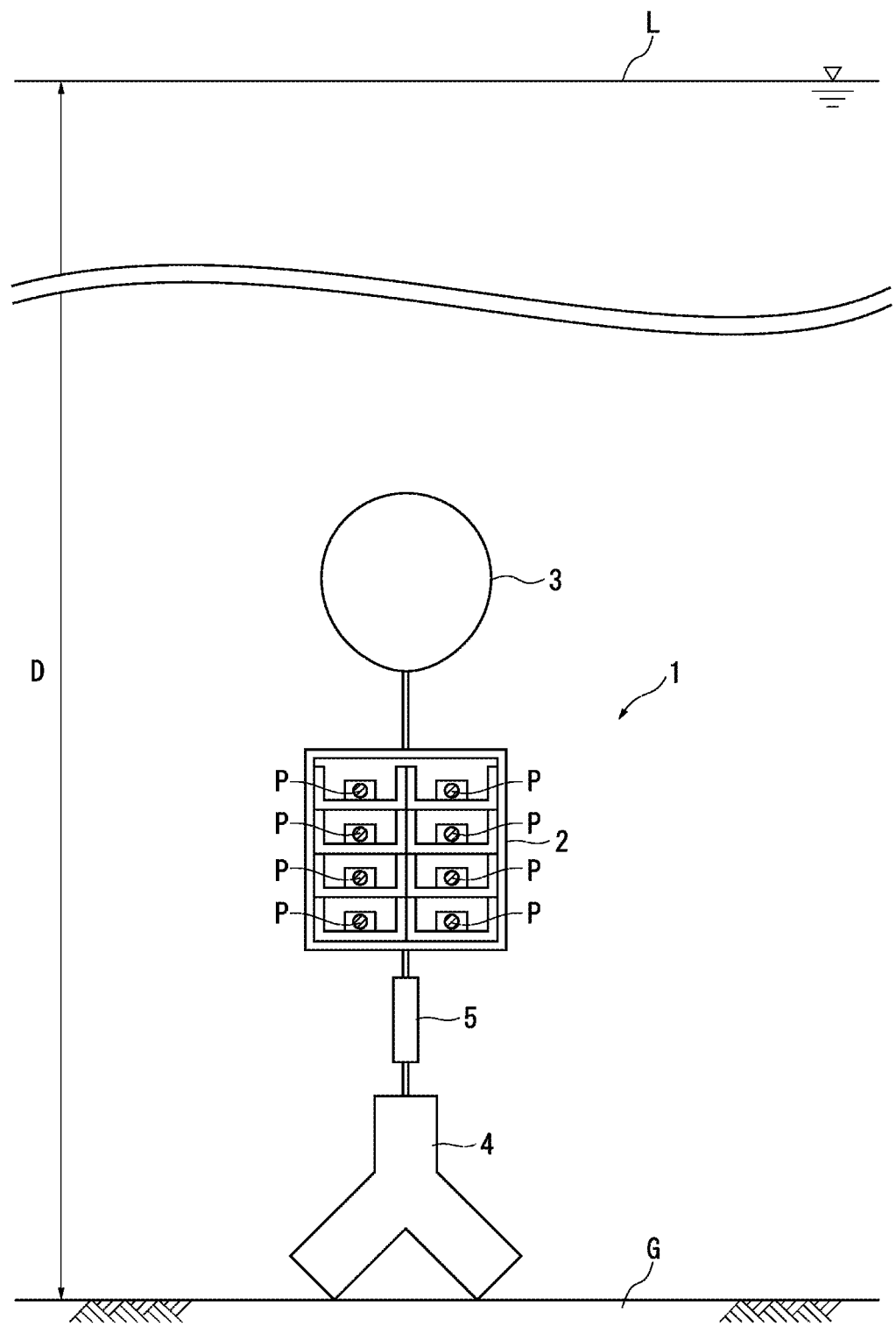
FIG. 1 is a schematic view illustrating a pressurization processing system according to a first embodiment.
Figure 2:
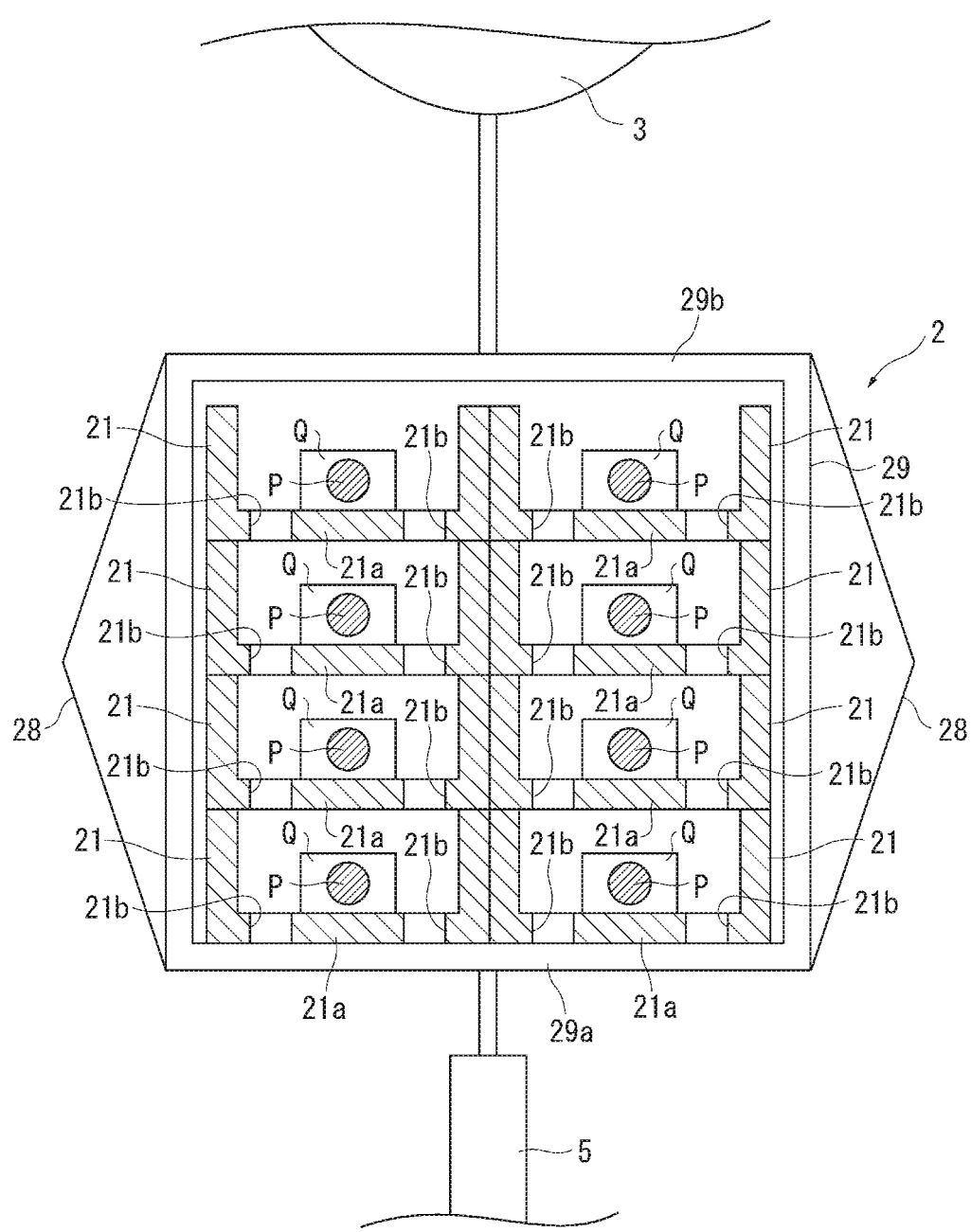
FIG. 2 is a schematic view mainly illustrating a housing body.
Figure 3:
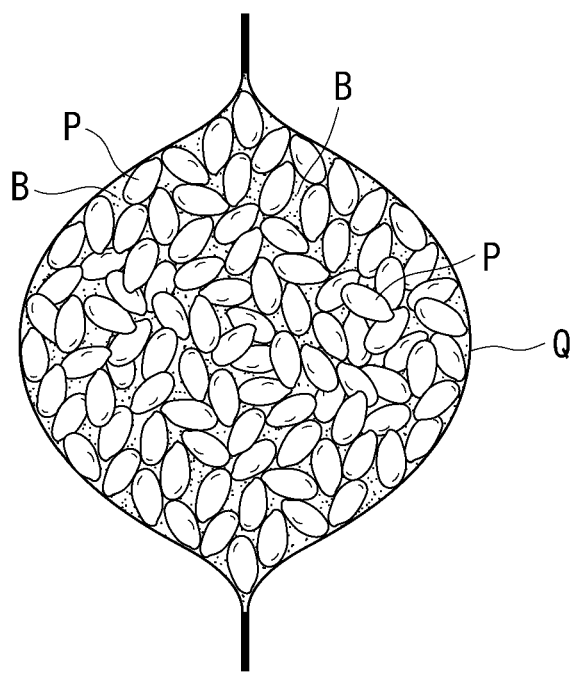
FIG. 3 is a schematic view mainly illustrating a sealed container.

FIG. 1 is a schematic view illustrating a pressurization processing system 1 according to a first embodiment. FIG. 2 is a schematic view mainly illustrating a housing body 2. FIG. 3 is a schematic view mainly illustrating a sealed container Q. The pressurization processing system 1 performs pressurization processing on a target P by immersing the target P in the sea or a lake. Hereinafter, a case where the target P is immersed in the sea will be described, and in the present disclosure, when the target P is immersed in the lake, the sea may be appropriately read as the lake.

The pressurization processing system 1 is provided in the vicinity of a sea bottom G having a water depth D of about 200 m to 10,000 m from a sea level L. The pressurization processing system 1 immerses the target P at the water depth D of about 200 m to 10,000 m for a predetermined period. Accordingly, a low temperature and a high pressure can be applied to the target P. Therefore, the pressurization processing system 1 can perform the pressurization processing on the target P. The water depth D may be appropriately set according to the pressure applied to the target P. The period of immersion of the target P in the sea may be appropriately set according to the target P, for example, one day, one week, one month, and one year.

When the target P is food, the pressurization processing system 1 can perform processing such as sterilization and pasteurization of the food by the applied pressure. When the target P is food, the pressurization processing system 1 can process the food with the applied pressure. The processing can be performed in such a manner that the target P such as an ingredient is impregnated with a liquid such as a soup stock by the applied pressure.

The target P is sealed in a vacuum state in the sealed container Q of a bag made of polyester, polypropylene, nylon, polyethylene, polyvinyl alcohol, polyvinylidene chloride, polyethylene terephthalate, ethylene vinyl alcohol, and polyvinyl alcohol having flexibility. As the sealed container Q, a bag having no water permeability or extremely low water permeability is used. The target P is, for example, food. The target P may be, for example, a kind of meat such as tuna, meat or yukhoe. The target P may be, for example, a fermented food such as cheese and natto. The target P may be, for example, processed food such as ham or hamburger. The target P may be, for example, a baby food. The target P may be, for example, a medicinal herb such as houttuynia. The target P may be, for example, a dairy product such as milk. The target P may be, for example, honey. The target P may be, for example, a beverage such as orange juice. The target P may be, for example, a shellfish such as an oyster, a scallop, and a clam. The target P may be, for example, a crustacean such as a crab and a shrimp. The target P may be, for example, a cephalopod such as an octopus and a squid. The target P may be, for example, a disaster prevention food, an emergency food, and the like. The target P may be, for example, alcohol such as liquor and wine. The target P may be, for example, fermented food such as soy sauce and miso. The target P may be, for example, a vegetable such as an onion, a carrot, a Japanese radish. The target P may be, for example, a pickle. The target P may be, for example, an ingredient enclosed together with a liquid such as a soup stock. The target P may be a jam. The target P may be rice or a vegetable, or may be sealed in the vacuum state in the sealed container Q together with a liquid such as water.

The target P may be a diamond. The target P may be a mixture of copper and aluminum. The target P may be, for example, wood enclosed together with a chemical solution such as a boric acid-based solution and a phosphoric acid-based solution.

As illustrated in FIG. 3, the sealed container Q may seal a plurality of targets P and powder B having a diameter small than that of the targets P. Thus, when the pressure acts on the target P via the flexible sealed container Q, the powder B is disposed in a gap between the plurality of targets P, and thus it is possible to prevent the target P from being ruptured by the excessive pressure acting thereon. The powder B may be powder obtained by pulverizing the target P. For example, rice is used as the target P, and rice powder is used as the powder B.

The pressurization processing system 1 includes the housing body 2, a buoyancy body 3, a weight body 4, and a separation mechanism 5. In the pressurization processing system 1, an apparent specific gravity of the whole body (mainly, housing body 2, buoyancy body 3, weight body 4, and separation mechanism 5) is about 1.1, which is equal to or higher than a specific gravity of seawater. Accordingly, the pressurization processing system 1 immersed in the sea naturally settles in the seawater.

The housing body 2 houses the target P. The housing body 2 includes a pallet 21 having a bottom part 21a on which the target P is placed, and a frame body 29 for supporting the pallet 21. In the housing body 2, the pallets 21 are stacked over a plurality of stages. The respective pallets 21 are connected to each other by a predetermined connecting unit such as a nylon rope which is not illustrated. In the pallet 21, a hole 21b is formed in the bottom part 21a. In the frame 29, an opening part which is not illustrated is formed in the bottom part 29a on which the pallet 21 is placed. The frame body 29 is formed by combining bar materials 29b so that an outer shape becomes a rectangular parallelepiped shape. The frame body 29 is provided with a net body such as wire netting which is not illustrated therearound. Accordingly, the pallet 21 can be prevented from falling off from the frame body 29. The buoyancy body 3 is mounted on an upper part of the frame 29. The separation mechanism 5 is mounted on a lower part of the frame 29.

The housing body 2 may be provided with a fin 28. For example, the fin 28 made of fiberglass reinforced plastic (FRP) is used. In the example illustrated in FIG. 2, the fin 28 is formed in a triangular shape so as to protrude toward the side orthogonal to a depth direction. The fin 28 is disposed at four corners of the frame 29 whose outer shape is a rectangular parallelepiped shape. Since the housing body 2 is provided with the fin 28, the housing body 2 can stably descend and float in the water. The housing body 2 may omit the frame body 29, and in this case, for example, the pallets 21 are connected to each other by the predetermined connecting unit such as a rope.

Figure 4:
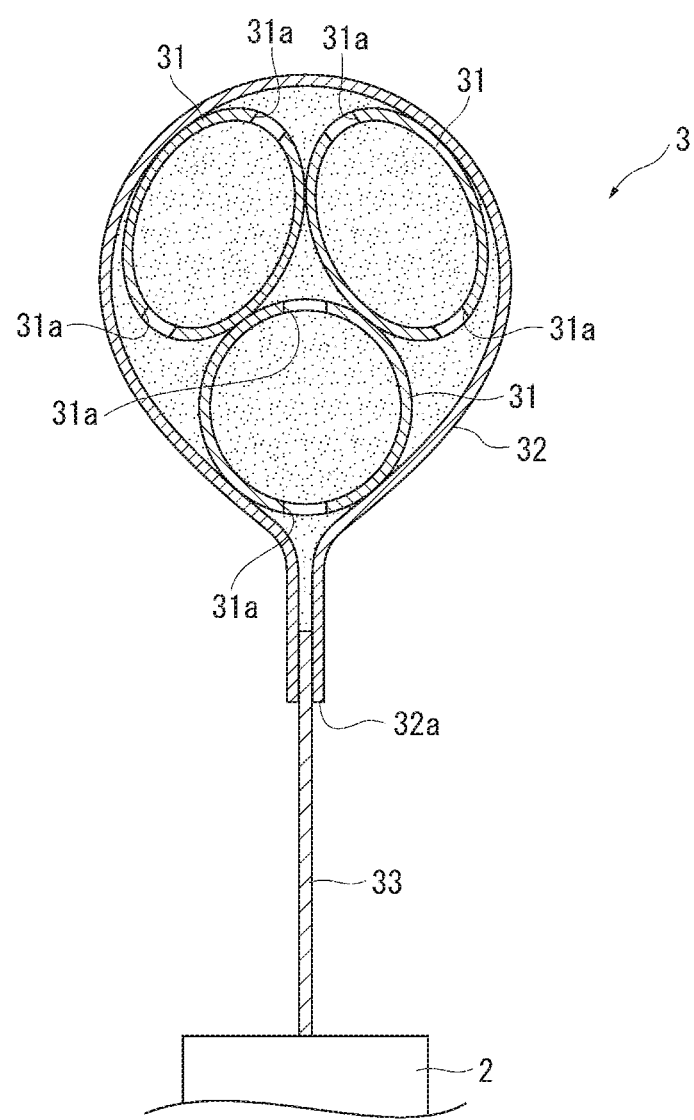
FIG. 4 is a cross-sectional view mainly illustrating a buoyancy body.

FIG. 4 is a cross-sectional view mainly illustrating the buoyancy body 3. The buoyancy body 3 causes the housing body 2 to float in the seawater. Buoyancy of the buoyancy body 3 acts in a state of being immersed in the sea. The buoyancy body 3 has a first housing bag 31 and a second housing bag 32. In the embodiment, one buoyancy body 3 is provided, and a plurality of buoyancy bodies 3 may be provided in the present disclosure.

The first housing bag 31 is a resin bag having flexibility such as polyethylene, polypropylene, and polyurethane. As the first housing bag 31, a bag having extremely low water permeability or no water permeability is used. In the first housing bag 31, a hole 31a is formed, and innumerable hollow glass spheres having a diameter of about 20 μm are housed. The hollow glass sphere having a diameter of 5 μm or more and 500 mm or less may be used. The hollow glass sphere having a diameter of 5 μm or more and 1,000 μm or less may be used and the hollow glass sphere having a diameter of 5 μm or more and 500 mm or less may be used. The hollow glass sphere can withstand a high-water pressure of about 200 m to 10,000 m water depth. The first housing bag 31 is a bag in which the hollow glass spheres manufactured in a factory are enclosed.

A bag having water permeability made of cloth is used for the second housing bag 32. The second housing bag 32 houses a plurality of first housing bags 31. An inlet part 32a is formed in the second housing bag 32, and one end of a wire 33 such as a rope is inserted into the inlet part 32a and fixed thereto. The other end of the wire 33 on the side opposite to one end is mounted on the housing body 2.

In order to manufacture the buoyancy body 3, first, the plurality of first housing bags 31 enclosed with innumerable hollow glass spheres manufactured in a factory are housed in the second housing bag 32. Next, the hole 31a is formed in the first housing bag 31 in the state of being housed in the second housing bag 32. Next, one end of the wire 33 such as a rope is fixed to the inlet part 32a of the second housing bag 32, thereby completing a manufacturing process of the buoyancy body 3.

By immersing the buoyancy body 3 in the seawater, the seawater intrudes into the second housing bag 32 having water permeability. The hollow glass sphere housed in the first housing bag 31 is diffused into the second housing bag 32 from the hole 31a of the first housing bag 31. Accordingly, the seawater is filled between the hollow glass spheres, and thus it is possible to suppress contact between the hollow glass spheres. Therefore, when the buoyancy body 3 is immersed in the seawater, it is possible not only to suppress an excessive pressure from acting on the hollow glass sphere, but also to prevent the hollow glass sphere from bursting.

The first housing bag 31 may be a water soluble bag such as paper. In this case, by immersing the buoyancy body 3 in the seawater, the seawater intrudes into the second housing bag 32 having water permeability. The hollow glass sphere housed in the first housing bag 31 is diffused into the second housing bag 32 when the first housing bag 31 is melted or torn. Accordingly, the seawater is filled between the hollow glass spheres, and thus it is possible to suppress the contact between the hollow glass spheres. Therefore, when the buoyancy body 3 is immersed in the seawater, it is possible not only to suppress the excessive pressure from acting on the hollow glass sphere, but also to prevent the hollow glass sphere from bursting.

Figure 5:
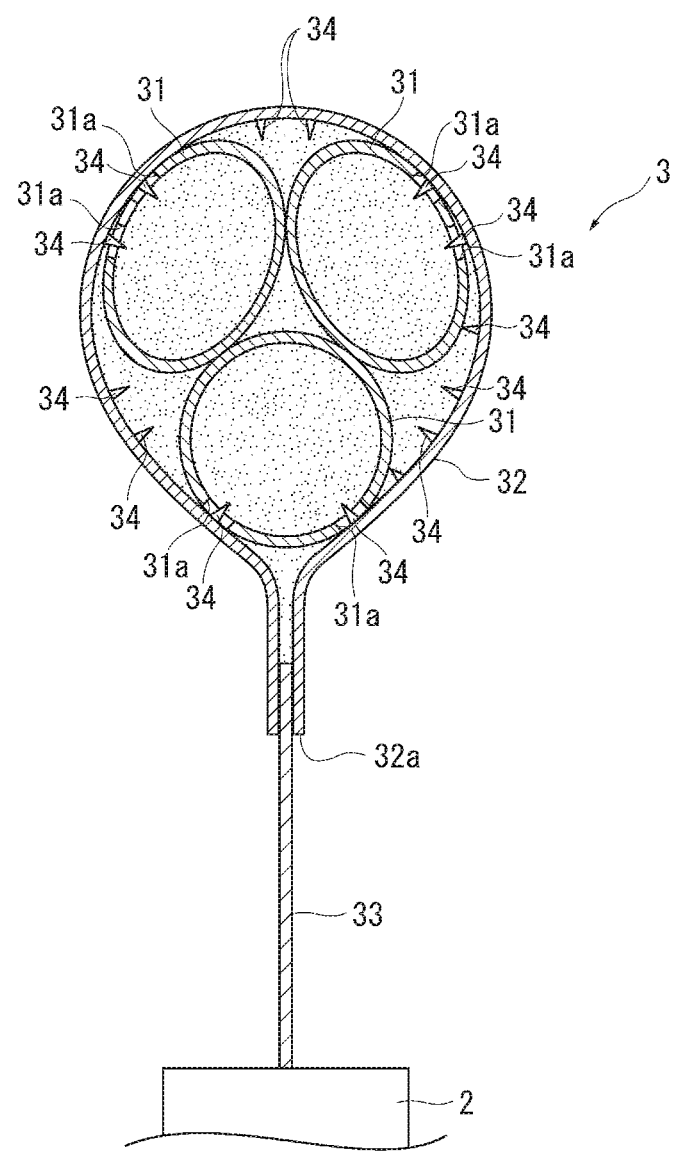
FIG. 5 is a cross-sectional view mainly illustrating a first modification of the buoyancy body.

FIG. 5 is a cross-sectional view mainly illustrating a first modification of the buoyancy body 3. The buoyancy body 3 includes a protruding part 34 such as a needle and a spine on an inner surface of the second housing bag 32. When the hole 31a is formed in the first housing bag 31, a plurality of first housing bags 31 in which innumerable hollow glass spheres manufactured in a factory are enclosed are housed in the second housing bag 32. Thus, the hole 31a is formed in the first housing bag 31 by the protruding part 34 of the second housing bag 32. Therefore, the hole 31a can be easily formed.

Figure 6:
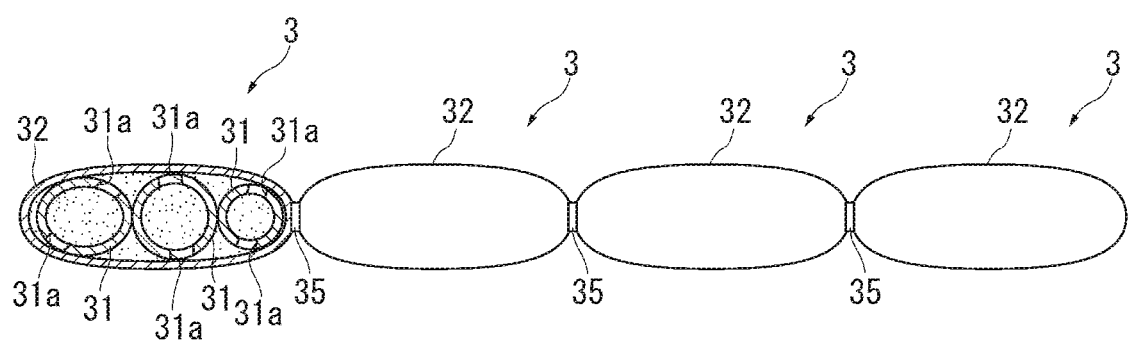
FIG. 6 is a cross-sectional view mainly illustrating a second modification of the buoyancy body.

FIG. 6 is a cross-sectional view mainly illustrating a second modification of the buoyancy body 3. The buoyancy body 3 may be connected to another buoyancy body 3 by a connecting part 35 such as a string. Although illustration is omitted, for example, a plurality of buoyancy bodies 3 according to the second modification may be mounted on the housing body 2 so as to be wound around the housing body 2.

The weight body 4 having a specific gravity greater than that of seawater or lake water is used. For example, concrete such as a tetrapod and a member having a predetermined weight such as a steel material or an iron waste are used as the weight body 4.

Figure 7:
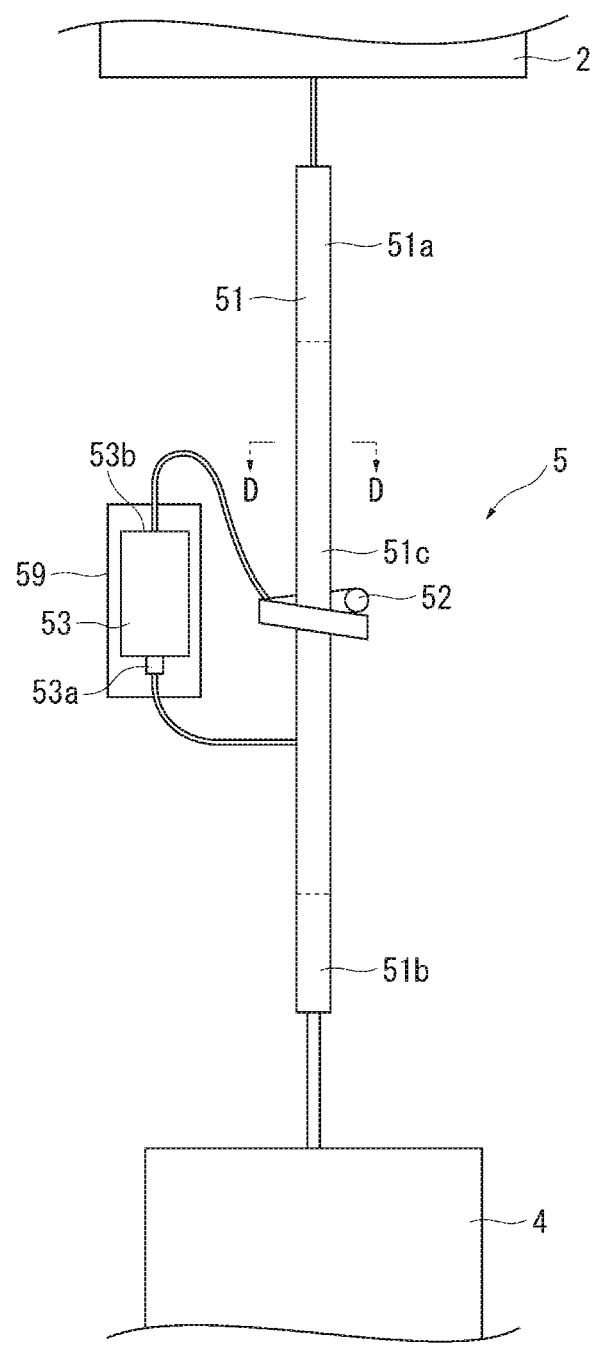
FIG. 7 is a schematic view mainly illustrating a separation mechanism.
Figure 8:
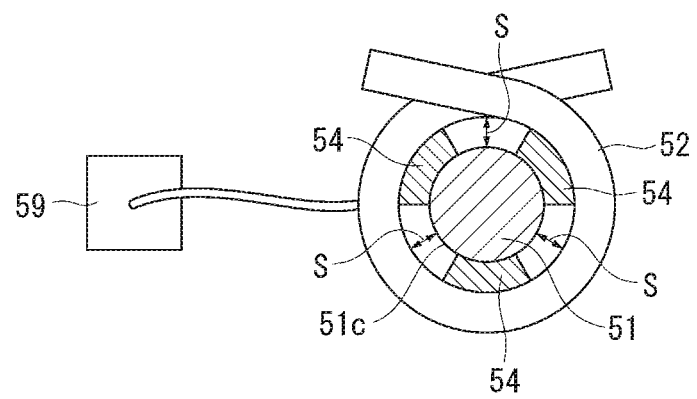
FIG. 8 is a cross-sectional view taken along the line D-D of FIG. 7.

FIG. 7 is a schematic view mainly illustrating the separation mechanism 5. FIG. 8 is a cross-sectional view taken along the D-D of FIG. 7. The separation mechanism 5 separably connects the housing body 2 and the weight body 4. The separation mechanism 5 includes a first metal member 51, a second metal member 52, and a power supply device 53 for supplying electricity.

A steel bar formed in a rod shape and a plate shape is used for the first member 51. The first member 51 includes a first mounting part 51a on which the housing body 2 is mounted, and a second mounting part 51b on which the weight body 4 is mounted. In the first member 51, a separation region 51c is formed between the first mounting part 51a and the second mounting part 51b.

As illustrated in FIG. 8, the second member 52 is formed in an annular shape, and for example, a spring ring and a spring washer are used therefor. The second member 52 is disposed around the first member 51 and is a member that can be expanded and contracted in a circumferential direction. The second member 52 is provided with a space S between the separation region 51c and the second member 52.

A battery for supplying electricity is used for the power supply device 53, the first member 51 is electrically connected to a cathode side 53a, and the second member 52 is electrically connected to an anode side 53b. The power supply device 53 is housed in a waterproof power supply box 59.

The power supply device 53 may include a remote control part for remotely controlling the supply of electricity by a sonar. Thus, in the power supply device 53, the activation thereof can be remotely controlled by operating a controller allowing a user on land or on the sea to operate the remote control part of the power supply device 53. The power supply device 53 is formed of a timer type, and may be activated with the lapse of time.

The separation mechanism 5 further includes an insulating member 54 for holding the space S. For example, a rubber elastic body is used as the insulating member 54. The second member 52 extends outward in the circumferential direction, and the insulating member 54 is disposed at the space S. Thus, a force trying to shrink inward acts on the second member 52. Therefore, the second member 52 applies a pressing force to the first member 51 via the insulating member 54.

Figure 9:
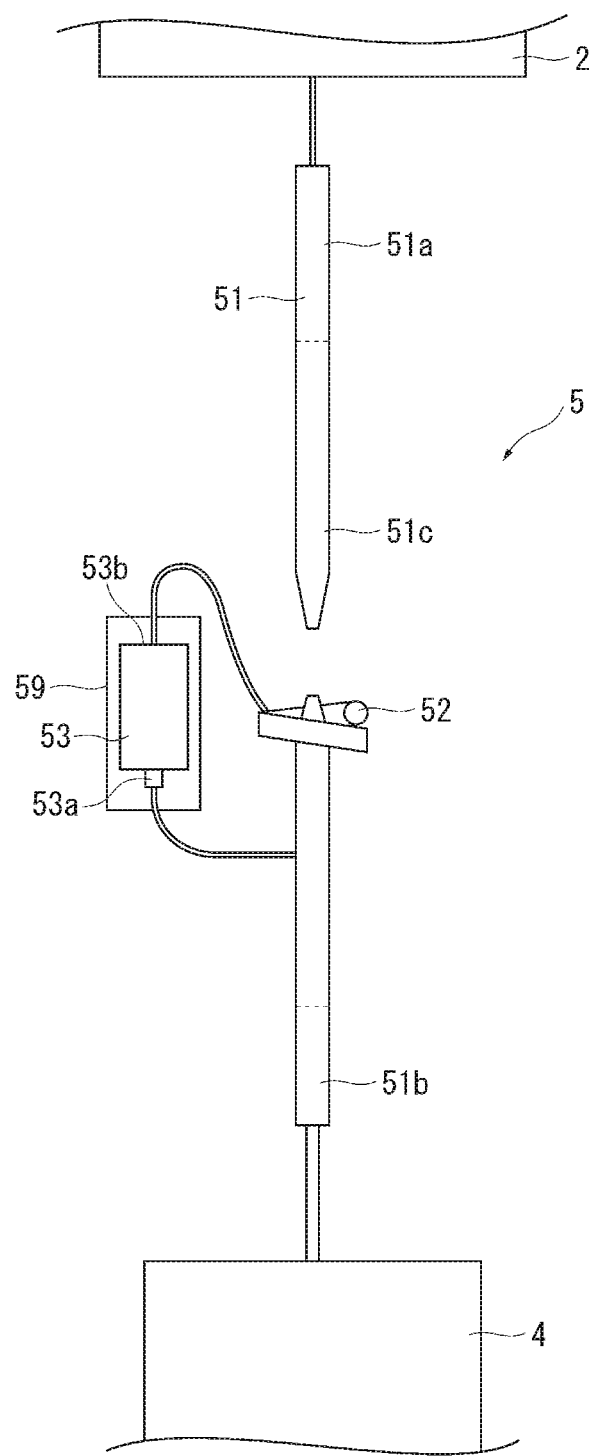
FIG. 9 is a schematic view mainly illustrating the separation mechanism in a separated state.

The separation mechanism 5 is immersed in seawater. At this time, a current flows between the separation region 51*c* of the first member 51 and the second member 52 through the seawater by the power supply device 53. Thus, the separation region 51*c* is forcibly corroded. Thus, the separation region 51*c* is gradually thinned. Finally, as illustrated in FIG. 9, the first member 51 is separated in the separation region 51*c*.

It is desirable that rust prevention treatment is not applied to the separation region 51*c*. Thus, the separation region 51*c* is more easily corroded. Therefore, the separation can be more surely performed in the separation region 51*c*. It is desirable that the rust prevention treatment is applied to the first mounting part 51*a* and the second mounting part 51*b*.

Next, an example of the operation of the pressurization processing system 1 according to the embodiment will be described.

As illustrated in FIG. 10A, the pressurization processing system 1 starts from a state of being transported to a predetermined position on the sea in advance by a ship 9 such as a marine vessel and a barge.

Next, as illustrated in FIG. 10B, the pressurization processing system 1 is caused to settle in the sea from the ship 9. At this time, since an apparent specific gravity of the whole body is greater than that of the seawater, the pressurization processing system 1 naturally settles toward the sea bottom G. As a result of the settling of the pressurization processing system 1 toward the sea bottom G, the pressurization processing system 1 is provided on the sea bottom G, and the target P is immersed at a predetermined water depth D of about 200 m to 10,000 m. Accordingly, a low temperature and a high pressure can be applied to the target P. Therefore, the pressurization processing system 1 can perform the pressurization processing on the target P.

As illustrated in FIG. 11A, after the lapse of the predetermined time, the separation mechanism 5 connecting the housing body 2 and the weight body 4 is separated, and the housing body 2 is naturally caused to float.

When the housing body 2 and the weight body 4 are separated from each other by the separation mechanism 5, first, the user on the ship 9 controls the controller to activate the power supply device 53. Electricity is supplied to the first member 51 and the second member 52 by activating the power supply device 53. At this time, a current flows between the separation region 51*c* of the first member 51 and the second member 52 through the seawater. Thus, the separation region 51*c* is forcibly corroded, and as illustrated in FIG. 9, the first member 51 is separated in the separation region 51*c*. At this time, in the pressurization processing system 1 from which the weight body 4 is separated, the apparent specific gravity of the whole body (mainly, the housing body 2, the buoyancy body 3, and the separation mechanism 5 on the side mounted on the housing body 2) is about 0.9 which is smaller than the specific gravity of the seawater. Therefore, the housing body 2 is separated from the weight body 4 by the separation mechanism 5, and naturally floats in seawater toward the sea level L (in a direction of an arrow U in the drawing) by the buoyancy of the buoyancy body 3.

As illustrated in FIG. 11B, the housing body 2 is caused to float on the sea level L, and the housing body 2 in which the target P is housed is collected by the ship 9. As described above, the pressurization processing of the target P performed by the pressurization processing system 1 is completed.

According to the embodiment, the pressurization processing system 1 includes: the housing body 2 for housing the target P; the buoyancy body 3 for causing the housing body 2 to float in the liquid; the weight body 4 having the specific gravity greater than that of the seawater; and the separation mechanism 5 for separably connecting the housing body 2 and the weight body 4. Thus, the housing body 2 is separated from the weight body 4 by the separation mechanism 5, and then naturally floats in the seawater by the buoyancy of the buoyancy body 3. Therefore, the target P immersed in the seawater can be easily collected.

According to the embodiment, the hollow glass sphere is housed in the first housing bag 31. Thus, when the buoyancy body 3 is manufactured, the hollow glass sphere of about 20 μm can be prevented from being scattered in the air. Thus, when the buoyancy body 3 is manufactured, a worker can be prevented from sucking the hollow glass sphere, and the work can be safely performed.

According to the embodiment, the buoyancy body 3 includes the first housing bag 31 in which the hollow glass sphere is housed and the hole is formed, and the second housing bag 32 in which the first housing bag 31 is housed. By immersing the buoyancy body 3 in the seawater, the seawater intrudes into the second housing bag 32 having water permeability.

Further, the hollow glass sphere housed in the first housing bag 31 is diffused into the second housing bag 32 from the hole 31*a* of the first housing bag 31. Thus, the seawater is filled between the hollow glass spheres, thereby making it possible to prevent the hollow glass spheres from contacting each other. Therefore, it is possible not only to suppress an excessive pressure from acting on the hollow glass sphere, but also to prevent the hollow glass sphere from bursting. As a result, since the buoyancy is secured by the air in the hollow glass sphere, the buoyancy of the buoyancy body 3 as a whole can also be secured.

According to the embodiment, the weight body 4 having the specific gravity greater than that of the seawater is provided. Thus, the target P can be held by immersing the target P in a stable state on the sea bottom. Therefore, the target P can be prevented from flowing away by a sea current.

According to the embodiment, in the power supply device 53, the first member 51 is electrically connected to the cathode side 53*a*, and the second member 52 is electrically connected to the anode side 53*b*. Thus, the first member 51 can be separated in the separation region 51*c* when the power supply device 53 supplies electricity. Therefore, the time or the number of days for collecting the target P immersed in the seawater can be easily controlled.

According to the embodiment, the separation mechanism 5 further includes the insulating member 54 for holding the space S, and the second member 52 applies the pressing force to the first member 51 via the insulating member 54. Thus, a corrosion region of the separation region 51*c* can be surely pressed. Therefore, the separation can be more surely performed in the separation region 51*c*.

According to the embodiment, it is desirable that the rust prevention treatment is not applied to the separation region 51*c*. Thus, the separation region 51*c* is more easily corroded. Therefore, the separation can be more surely performed in the separation region 51*c*.

According to the embodiment, the pressurization processing system 1 further includes the sealed container Q that seals a plurality of targets P and powder having the diameter smaller than that of the target P, and has flexibility. Thus, when the pressure acts on the target P via the sealed container Q having flexibility, the powder is disposed in the gap between the plurality of targets P, and the powder can prevent the excessive pressure from acting on the target P.

According to the embodiment, the annular second member 52 is disposed so as to surround the first member 51. Thus, the corrosion of the first member 51 can be uniformly advanced from the circumferential direction of the second member 52.

Figure 12:
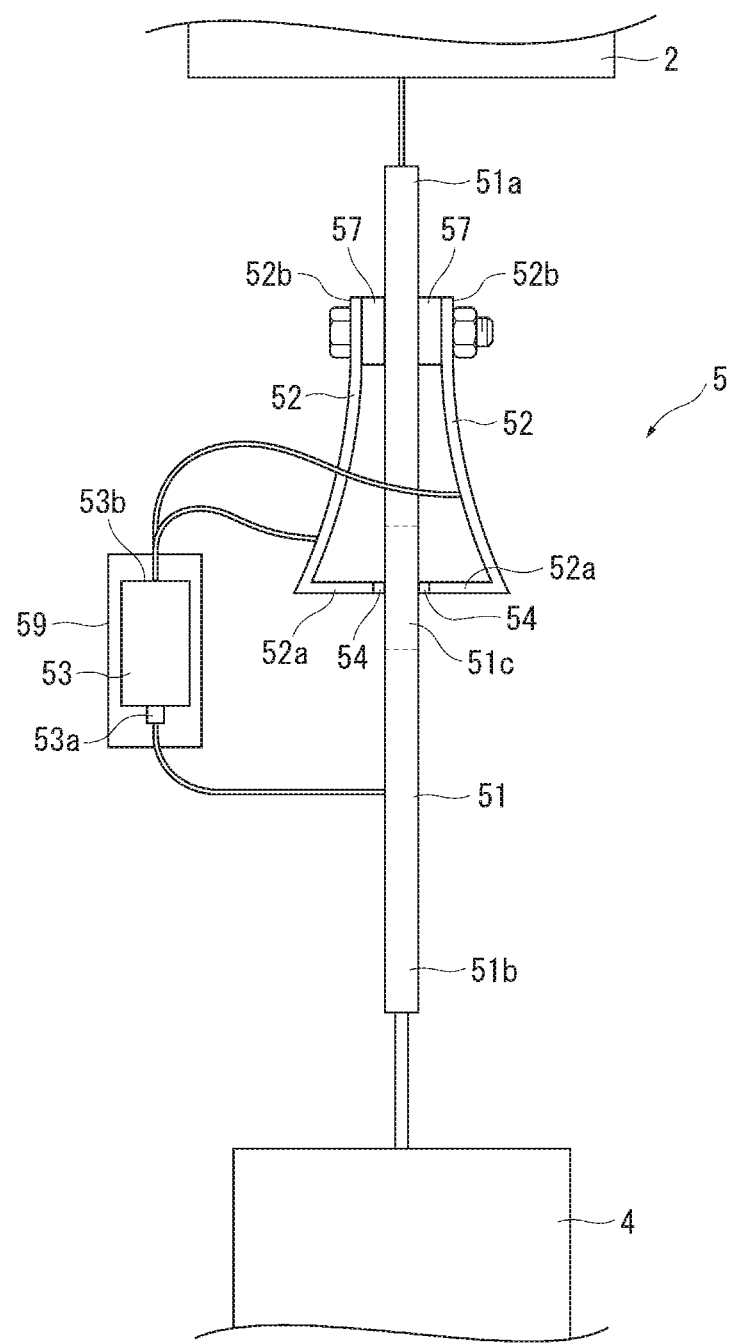
FIG. 12 is a schematic view mainly illustrating a first modification of the separation mechanism.

Next, a first modification of the separation mechanism 5 will be described. FIG. 12 is a schematic view illustrating a first modification of the separation mechanism 5.

The separation mechanism 5 includes the first metal member 51, the second metal member 52, and the power supply device 53 for supplying electricity.

The second member 52 is provided on the opposite sides of the plate-shaped first member 51 so that the plate-shaped first member 51 is interposed between the second members 52. The second member 52 is formed by using a metal plate and bending a tip end part 52a. An insulator 57 such as a rubber elastic body is provided between the first member 51 and a base end part 52b of the second member 52, and the base end part 52b of the second member 52 is fixed to the first member 51 by a fixing member such as a bolt nut via the insulator 57. Thus, the tip end part 52a of the second member 52 made of the metal plate applies a pressing force to the first member 51 via the insulating member 54.

The separation mechanism 5 is immersed in seawater. At this time, a current flows between the separation region 51c of the first member 51 and the second member 52 through the seawater by the power supply device 53. Accordingly, the separation region 51c is forcibly corroded, and the first member 51 is separated in the separation region 51c. At this time, the housing body 2 is separated from the weight body 4 by the separation mechanism 5, and naturally floats in the seawater by the buoyancy of the buoyancy body 3.

According to the embodiment, the second member 52 is provided on the opposite sides of the first member 51 so that the first member 51 is interposed between the second members 52. Thus, the corrosion region of the separation region 51c can be more surely pressed. Therefore, the separation can be more surely performed in the separation region 51c.

Figure 13:
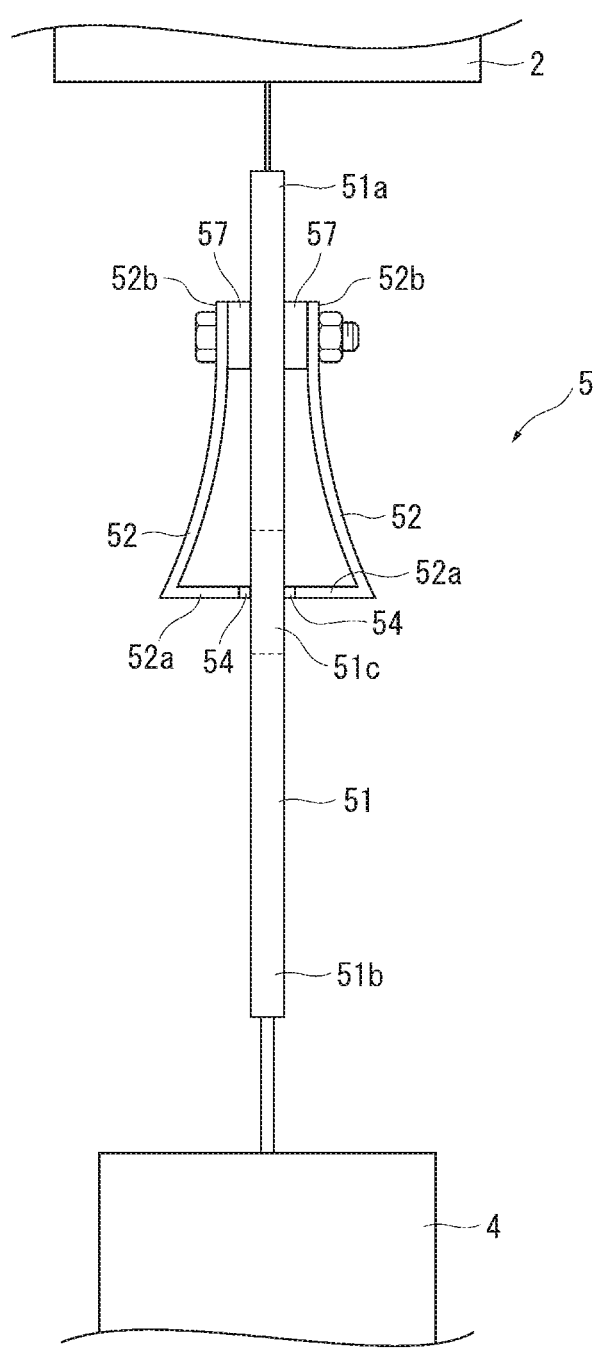
FIG. 13 is a schematic view mainly illustrating a second modification of the separation mechanism.

Next, a second modification of the separation mechanism 5 will be described. FIG. 13 is a schematic view illustrating the second modification of the separation mechanism 5.

The separation mechanism 5 includes the first metal member 51 and the second metal member 52 which is more noble than the first member 51. The power supply device 53 is omitted in the separation mechanism 5.

The first member 51 includes the first mounting part 51a on which the housing body 2 is mounted and the second mounting part 51b on which the weight body 4 is mounted, and the separation region 51c is formed between the first mounting part 51a and the second mounting part 51b. The second member is provided with a space between the separation region and the second member.

The separation mechanism 5 is immersed in seawater. At this time, a current flows between the separation region 51c of the first member 51 and the second member 52 through the seawater. Thus, the separation region 51c is corroded, and the first member 51 is separated in the separation region 51c. At this time, the housing body 2 is separated from the weight body 4 by the separation mechanism 5, and naturally floats in the seawater by the buoyancy of the buoyancy body 3.

According to the embodiment, the separation mechanism 5 includes the first metal member 51 and the second metal member 52 which is more noble than the first member 51.

The first member 51 includes the first mounting part 51a on which the housing body 2 is mounted and the second mounting part 51b on which the weight body 4 is mounted. The separation region 51c is formed between the first mounting part 51a and the second mounting part 51b, and the second member 52 is provided with the space S between the separation region 51c and the second member 52. Thus, after the lapse of a predetermined time, the first member 51 can be separated in the separation region 51c. Therefore, the target P immersed in the sea can be more easily collected.

Figure 14:
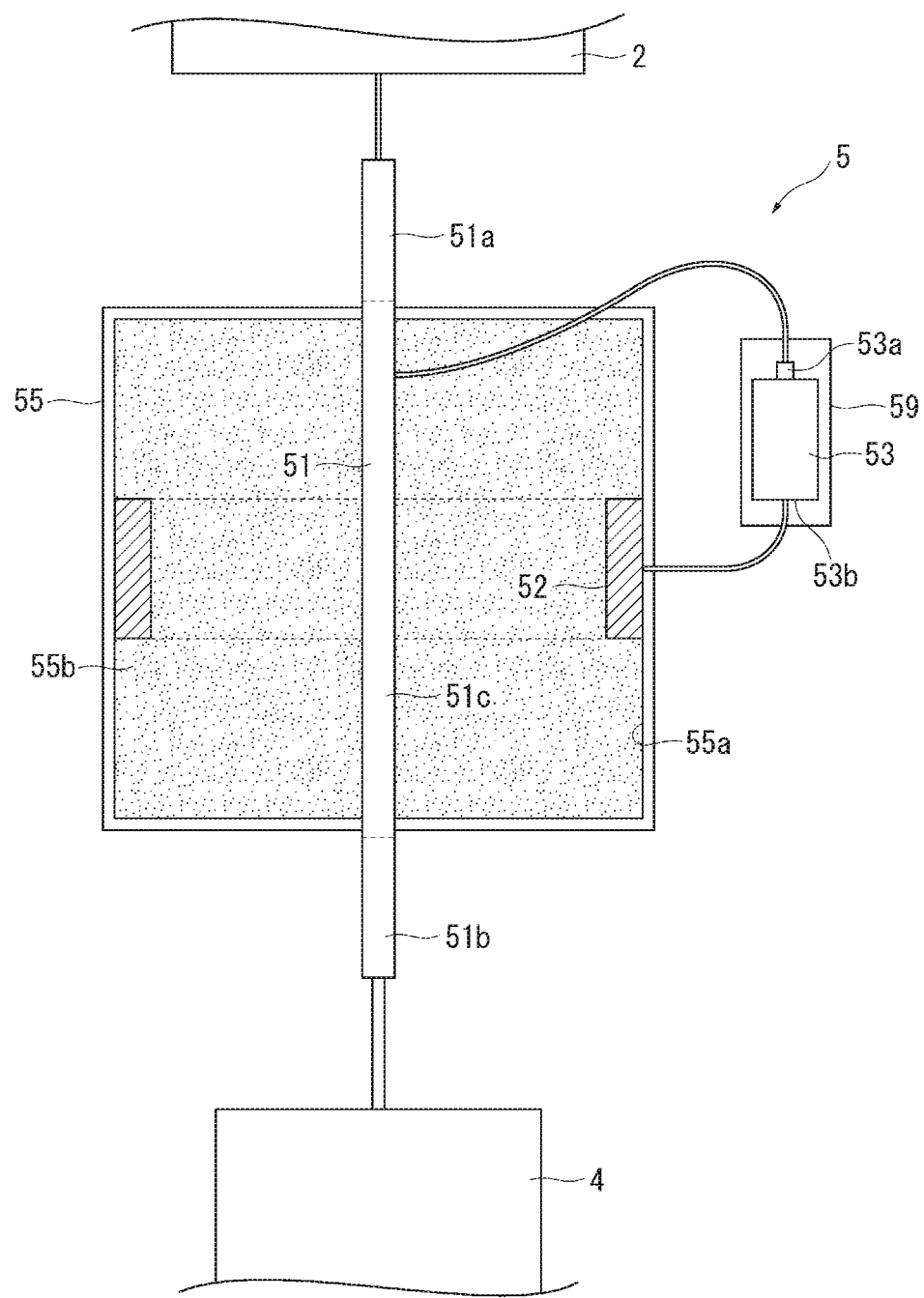
FIG. 14 is a schematic view mainly illustrating a third modification of the separation mechanism.

Next, a third modification of the separation mechanism 5 will be described. FIG. 14 is a schematic view illustrating the third modification of the separation mechanism 5.

The separation mechanism 5 includes the first metal member 51, the second metal member 52, and the power supply device 53 for supplying electricity. In the power supply 53, the first member 51 is electrically connected to the cathode side 53a, and the second member 52 is electrically connected to the anode side 53b.

The separation mechanism 5 further includes an insulating enclosure part 55 in which the second member 52 and at least the separation region 51c are housed. For example, an insulating container such as a plastic container is used for the enclosure part 55. The enclosure part 55 is filled with an electrolyte solution such as dilute sulfuric acid aqueous solution and hydrochloric acid.

The first member 51 is formed in a rod shape and disposed so as to penetrate the enclosure part 55. In the first member 51, the first mounting part 51a and the second mounting part 51b are disposed outside the enclosure part 55.

The second member 52 is annularly formed and provided on the inner surface 55a of the enclosure part 55.

The separation mechanism 5 is immersed in seawater. At this time, a current flows between the separation region 51c of the first member 51 and the annular second member 52 through the electrolytic solution filled in the enclosure part 55 by the power supply device 53. Thus, the separation region 51c is forcibly corroded, and the first member 51 is separated in the separation region 51c. At this time, the housing body 2 is separated from the weight body 4 by the separation mechanism 5, and naturally floats in the seawater by the buoyancy of the buoyancy body 3.

According to the embodiment, in the power supply device 53, the first member 51 is electrically connected to the cathode side 53a, and the second member 52 is electrically connected to the anode side 53b. Thus, according to the current of the power supply device 53 to be supplied, the first member 51 can be separated in the separation region 51c after the lapse of a predetermined time. Therefore, it is possible to easily control the time for collecting the target P immersed in the seawater.

According to the embodiment, the enclosure part 55 is filled with the electrolytic solution. Thus, the corrosion of the separation region 51c can be easily generated. Therefore, the separation can be more surely performed in the separation region 51c.

Figure 15:
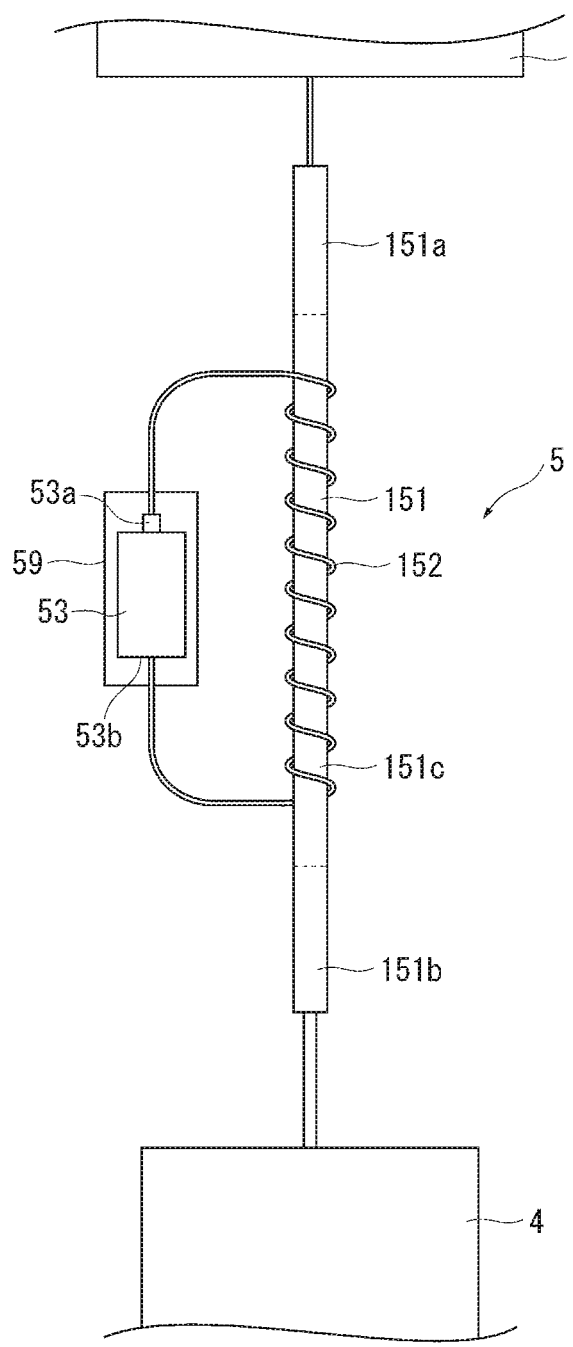
FIG. 15 is a schematic view mainly illustrating a fourth modification of the separation mechanism.
Figure 16:
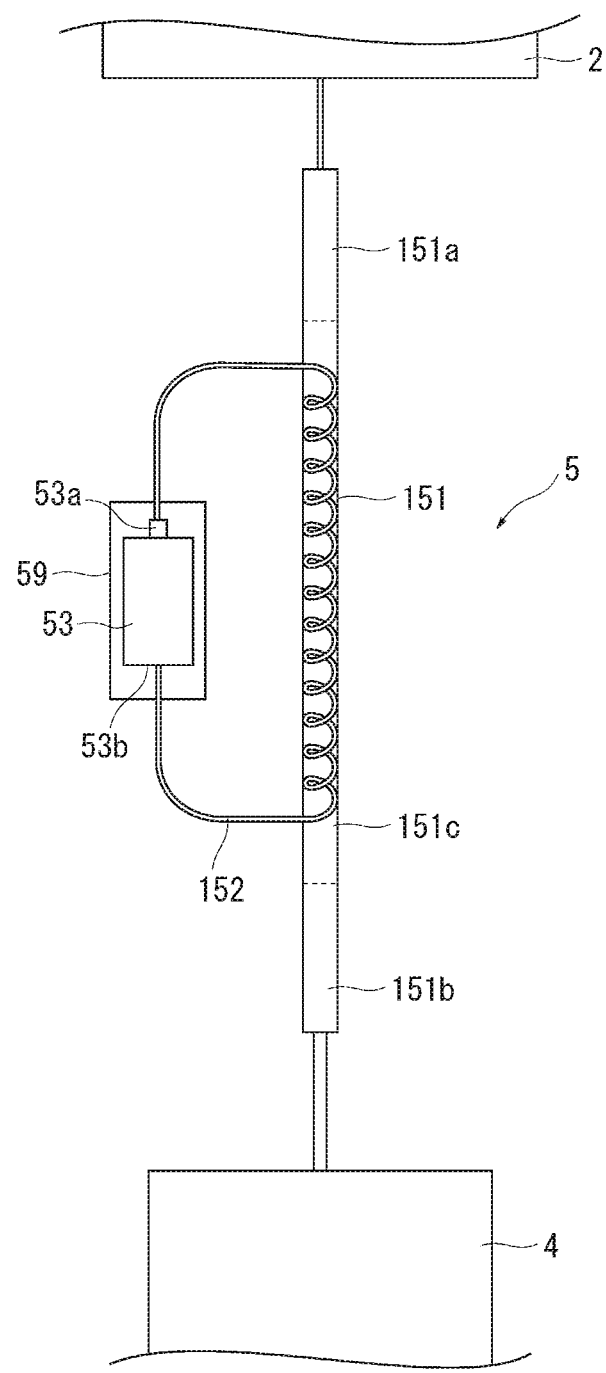
FIG. 16 is a schematic view mainly illustrating a fifth modification of the separation mechanism.

Next, a fourth modification and a fifth modification of the separation mechanism 5 will be described. FIG. 15 is a schematic view illustrating the fourth modification of the separation mechanism 5. FIG. 16 is a schematic view illustrating the fifth modification of the separation mechanism 5.

The separation mechanism 5 includes: a rod-shaped first member 151 having a thermal melting property; a second member 152 having an electrothermal property; and the power supply device 53 that supplies a current to the second member 152. The first member 151 includes a first mounting part 151a on which the housing body 2 is mounted and a second mounting part 151b on which the weight body 4 is mounted. A separation region 151c is formed between the first mounting part 151a and the second mounting part 151b. The power supply device 53 is housed in the waterproof power supply box 59. The second member 152 is subjected to waterproof treatment so as to be thermally melted in the seawater which will be described later.

As illustrated in FIG. 15, the second member 152 is provided in the separation region 151c. The second member 152 is wound around the separation region 151c. As illustrated in FIG. 16, the second member 152 may be incorporated in the separation region 151c.

The separation mechanism 5 is immersed in seawater. At this time, the second member 152 is heated by activating the power supply device 53 and supplying electricity to the second member 152. Thus, the separation region 151c of the first member 151 having the thermal melting property is thermally melted, and the first member 151 is separated in the separation region 151c. At this time, the housing body 2 is separated from the weight body 4 by the separation mechanism 5, and naturally floats in the seawater by the buoyancy of the buoyancy body 3.

According to the embodiment, the separation mechanism 5 includes: the rod-shaped first member 151 having the thermal melting property; the second member 152 having the electrothermal property; and the power supply device 53 that supplies a current to the second member 152. The first member 151 includes the first mounting part 151a on which the housing body 2 is mounted and the second mounting part 151b on which the weight body 4 is mounted. The separation region 151c is formed between the first mounting part 151a and the second mounting part 151b, and the second member 152 is wound around the separation region 151c. Thus, according to the current of the power supply device 53 to be supplied, the first member 151 can be separated in the separation region 151c after the lapse of the predetermined time. Therefore, it is possible to easily control the time for collecting the target P immersed in the seawater.

Figure 17:
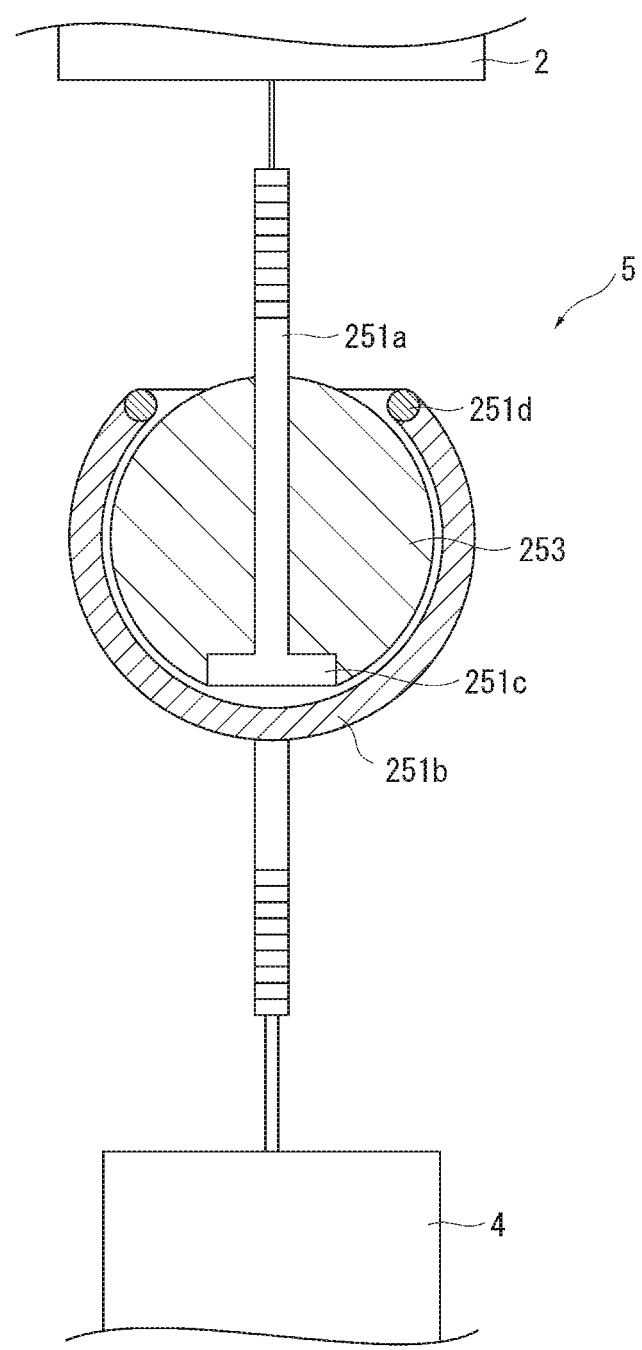
FIG. 17 is a schematic view mainly illustrating a sixth modification of the separation mechanism.

Next, a sixth modification of the separation mechanism 5 will be described. FIG. 17 is a schematic view illustrating the sixth modification of the separation mechanism 5.

The separation mechanism 5 includes: a first mounting part 251a on which the housing body 2 is mounted; a second mounting part 251b on which the weight body 4 is mounted; and a soluble body 253 that connects the first mounting part 251a and the second mounting part 251b, and dissolves in the seawater.

The first mounting part 251a is formed in, for example, a bolt shape made of a resin, and the soluble body 253 having a predetermined size is provided in a head part 251c.

The second mounting part 251b uses a member made of a resin and includes a locking part 251d that locks the soluble body 253.

The soluble body 253 has water solubility and a predetermined shape. As the soluble body 253, for example, ice sugar, salt, biodegradable plastic that dissolves in seawater, and a water-soluble adhesive are used.

Figure 18:
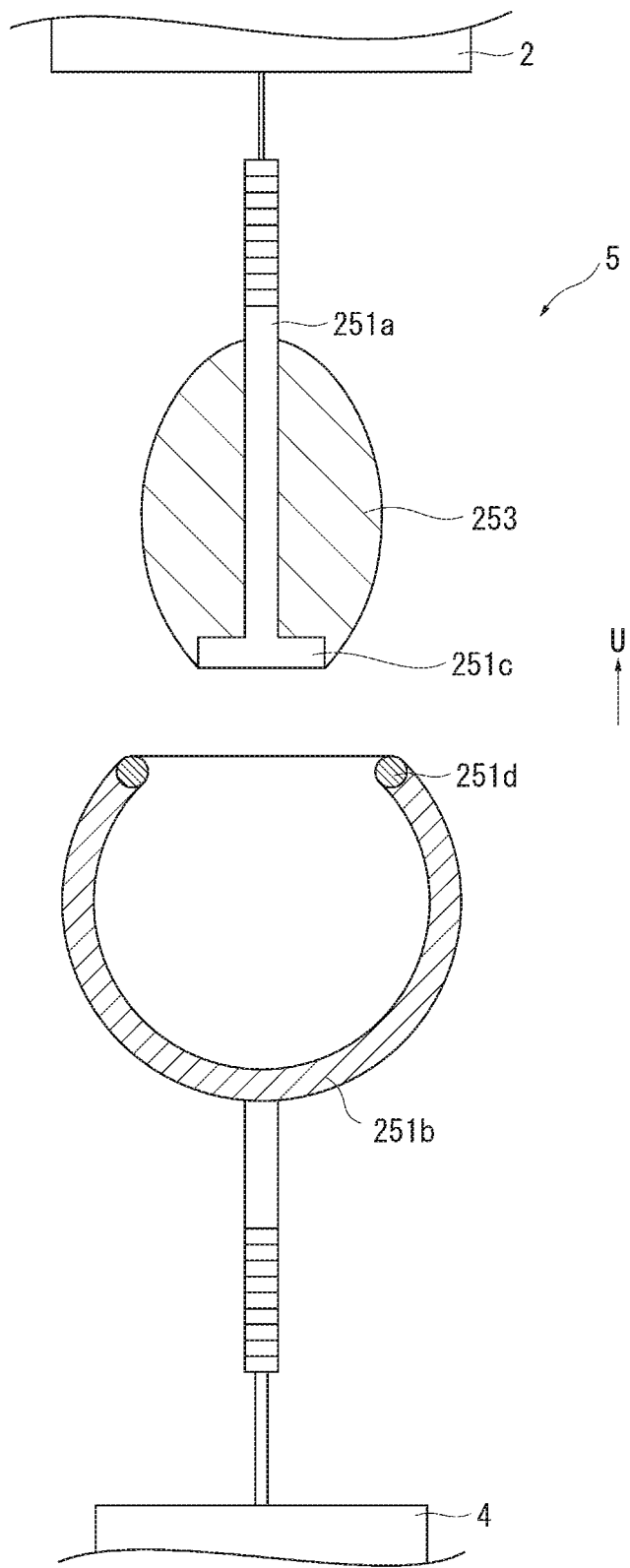
FIG. 18 is a schematic view mainly illustrating the sixth modification of the separation mechanism in a separated state.

FIG. 18 is a schematic view illustrating the sixth modification of the separation mechanism 5 in a separated state. The separation mechanism 5 is immersed in seawater.

As time passes, the soluble body 253 locked to the locking part 251d gradually dissolves in the seawater. Next, when the soluble body 253 dissolves in the seawater, the locking of the locking part 251d is released, and the connected first mounting part 251a and second mounting part 251b are separated from each other. As a result, the housing body 2 naturally floats in the seawater by the buoyancy of the buoyancy body 3. Therefore, the target P immersed in the seawater can be easily collected.

According to the embodiment, the separation mechanism 5 includes: the first mounting part 251a on which the housing body 2 is mounted; the second mounting part 251b on which the weight body 4 is mounted; and the soluble body 253 that connects the first mounting part 251a and the second mounting part 251b, and dissolves in the seawater. As time passes, the soluble body 253 gradually dissolves in the seawater. Next, when the soluble body 253 dissolves in the seawater, the connected first mounting part 251a and second mounting part 251b are separated from each other. As a result, the housing body 2 naturally floats in the seawater. Therefore, the target P immersed in the seawater can be easily collected.

Although illustration is omitted, the separation mechanism 5 may include an opening and closing typed opening and closing box surrounding the soluble body 253. The opening and closing box is configured so as to be openable and closable, for example, by the control of a user or the lapse of time such as a timer type. When the opening and closing box is provided and immersed in the seawater, the soluble body 253 is surrounded by the opening and closing box in a closed state, and the soluble body 253 does not contact the seawater, such that the soluble body 253 does not dissolve. After the lapse of a predetermined time, for example, the opening and closing box is opened by the control of the user. Thus, the soluble body 253 contacts the seawater, and the soluble body 253 starts to dissolve in the seawater. When the soluble body 253 dissolves, the connected first mounting part 251a and the second mounting part 251b are separated from each other. As a result, the housing body 2 naturally floats in the seawater. Therefore, when the opening and closing box is provided, it is possible to easily control the time for collecting the target P immersed in the seawater.

Figure 19:
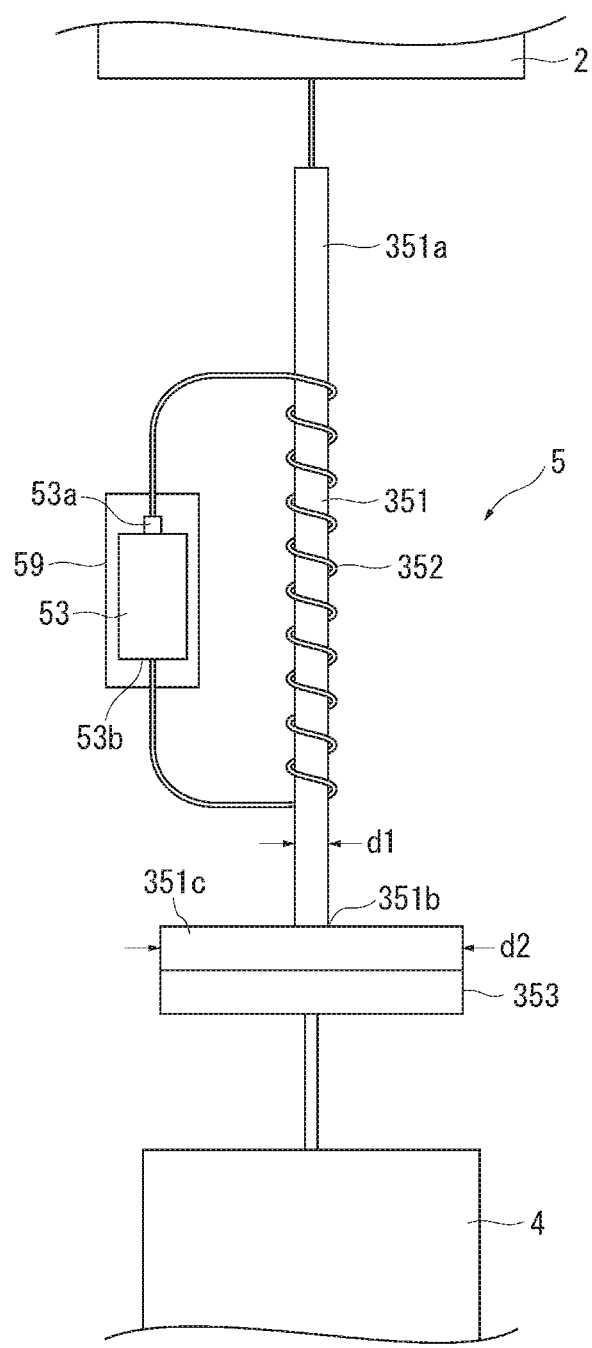
FIG. 19 is a schematic view mainly illustrating a seventh modification of the separation mechanism.

Next, a seventh modification of the separation mechanism 5 will be described. FIG. 19 is a schematic view illustrating the seventh modification of the separation mechanism 5.

The separation mechanism 5 includes: a first member 351 which is a metal rod-shaped member; a second member 352 which is a coil wound around the first member 351; a power supply device 53 that supplies electricity to the second member 352; and a third member 353 which is a permanent magnet.

For example, an iron core is used for the first member 351. In the first member 351, the housing body 2 is mounted on the side of one end part 351a side, and the third member 353 is mounted on the side of the other end part 351b. The first member 351 includes an enlarged diameter part 351c having a diameter D2 larger than a diameter D1 of the first member 351 at the other end part 351b, and the third member 353 is mounted thereon via the enlarged diameter part 351c. An iron plate may be used for the enlarged diameter part 351c.

In the power supply device 53, one end part of the second member 352 is mounted on the cathode side 53a, and the other end part of the second member 352 is mounted on the anode side 53b.

The weight body 4 is mounted on the third member 353.

The separation mechanism 5 is immersed in seawater. At this time, the separation mechanism is immersed in the seawater in a state where the power supply device 53 is activated. Thus, electricity is supplied to the second member, and a magnetic force toward an axial direction of the first member 351 is generated. Therefore, the side of the other end part 351b of the first metal member 351 can be connected to the third member 353 which is the permanent magnet.

Figure 20:
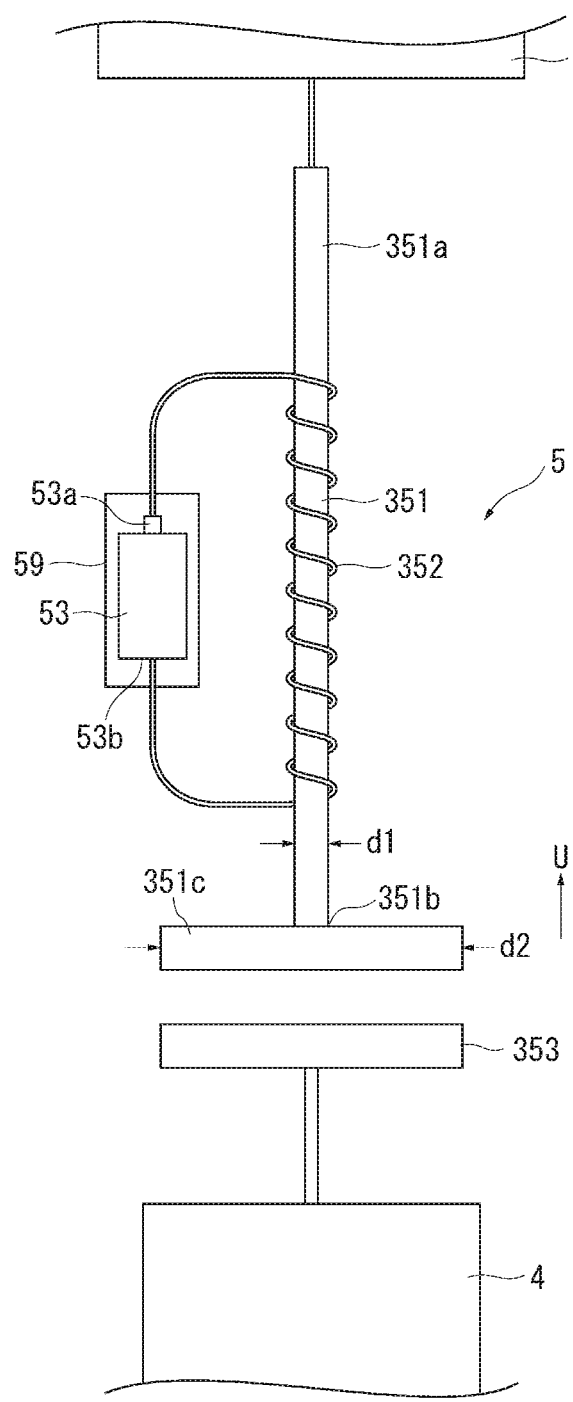
FIG. 20 is a schematic view mainly illustrating the seventh modification of the separation mechanism in a separated state.

FIG. 20 is a schematic view illustrating the seventh modification of the separation mechanism 5 in a separated state. After the lapse of a predetermined time, the activation of the power supply device 53 is stopped. Thus, the magnetic force toward the axial direction of the first member 351 is reduced or does not act. Therefore, the side of the other end part 351b of the first metal member 351 is separated from the third member 353 which is the permanent magnet. At this time, the housing body 2 is separated from the weight body 4 by the separation mechanism 5, and naturally floats in the seawater in a direction of an arrow U in the drawing by the buoyancy of the buoyancy body 3.

According to the embodiment, the separation mechanism 5 includes: the first member 351 which is the metal rod-shaped member; the second member 352 which is the coil wound around the first member 351; the power supply device 53 that supplies electricity to the second member 352; and the third member 353 which is the permanent magnet. The housing body 2 is mounted on the side of one end part 351a of the first member 351, the third member 353 is mounted on the side of the other end part 352b thereof, and the weight body 4 is mounted on the third member 353. Thus, according to the current of the power supply device 53 to be supplied, the side of the other end part 351b of the first metal member 351 can be separated from the third member 353 which is the permanent magnet after the lapse of the predetermined time. Therefore, it is possible to easily control the time for collecting the target P immersed in the seawater.

Figure 21:
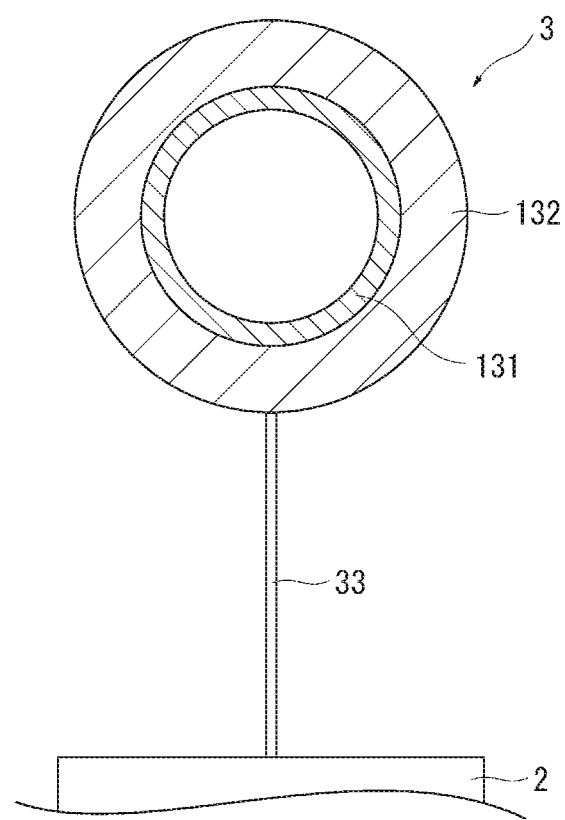
FIG. 21 is a schematic cross-sectional view illustrating a third modification of the buoyancy body.

Next, a third modification of the buoyancy body 3 will be described. FIG. 21 is a schematic cross-sectional view illustrating the third modification of the buoyancy body 3.

The buoyancy body 3 uses a hollow glass sphere 131 having a diameter of about 500 mm and includes a covering buffer material 132 that covers the hollow glass sphere 131.

For, example, the covering buffer material 132 uses a resin made of polyester, polypropylene, nylon, polyethylene, polyvinyl alcohol, polyvinylidene chloride, polyethylene terephthalate, ethylene vinyl alcohol, and polyvinyl alcohol. In the buoyancy body 3, the covering buffer material 132 is mounted on the housing body 2 via the wire 33.

According to the embodiment, the buoyancy body 3 includes the covering buffer material 132 that covers the hollow glass sphere 131. Accordingly, even though an external force acts on the buoyancy body 3, the external force is buffered by the covering buffer material 132, and thus the hollow glass sphere 131 can be prevented from rupturing.

Therefore, since the buoyancy is secured by the air inside the hollow glass sphere 131, the buoyancy of the buoyancy body 3 as a whole can be secured.

Figure 22:
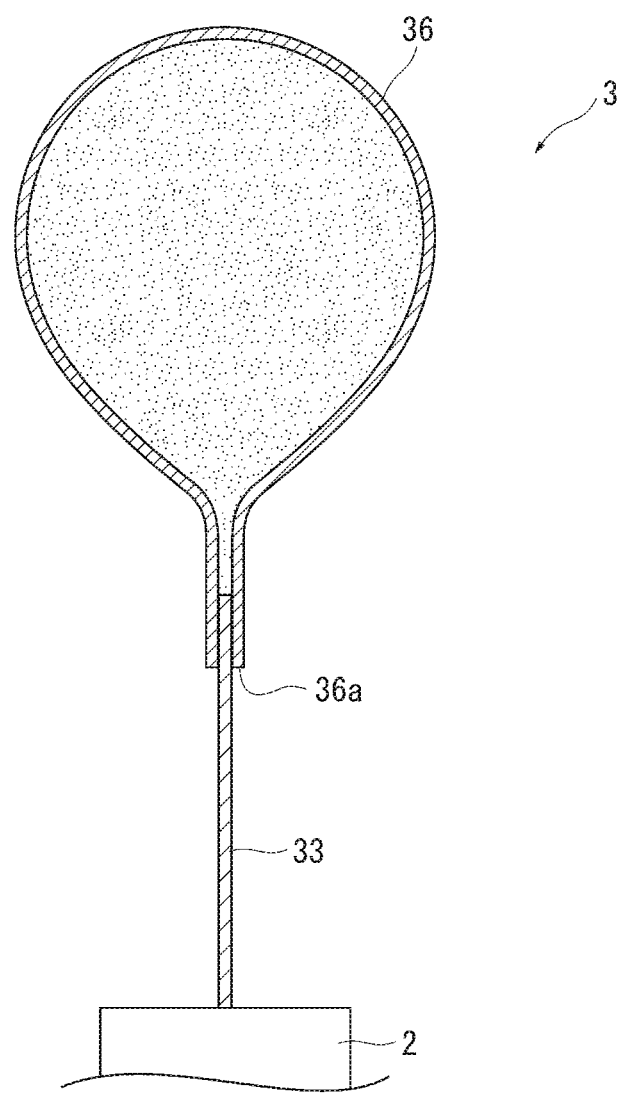
FIG. 22 is a cross-sectional view mainly illustrating a fourth modification of the buoyancy body.

Next, a fourth modification of the buoyancy body 3 will be described. FIG. 22 is a schematic cross-sectional view illustrating the fourth modification of the buoyancy body 3.

The buoyancy body 3 includes a housing bag 36 having water permeability. The housing bag 36 houses a plurality of hollow glass spheres, and a space between the plurality of hollow glass spheres is filled with a liquid.

A bag made of cloth having water permeability is used for the housing bag 36. The plurality of hollow glass spheres are housed in the housing bag 36. For example, the hollow glass sphere, for example, having a diameter of 5 µm or more and 1,000 µm or less is used. An inlet part 36a is formed in the housing bag 36, and one end of the wire 33 such as a rope is inserted into the inlet part 36a and fixed thereto. The other end of the wire 33 on the side opposite to one end thereof is mounted on the housing body 2. In the housing bag 36, the space between the plurality of hollow glass spheres is filled with a liquid such as water and seawater.

According to the embodiment, the buoyancy body 3 includes the housing bag 36 having water permeability. The housing bag 36 houses the plurality of hollow glass spheres, and the space between the plurality of hollow glass spheres is filled with the liquid. Therefore, it is possible not only to suppress an excessive pressure from acting on the hollow glass sphere, but also to prevent the hollow glass sphere from bursting. As a result, since the buoyancy is secured by the air in the hollow glass sphere, the buoyancy of the buoyancy body 3 as a whole can also be secured.

According to the embodiment, since the plurality of hollow glass spheres are housed in the single housing bag 36 filled with the liquid, it becomes difficult to form a lump of the air inside the housing bag 36. Therefore, it is possible not only to more surely suppress the excessive pressure from acting on the hollow glass sphere, but also to prevent the hollow glass sphere from bursting. As a result, since the buoyancy is secured by the air in the hollow glass sphere, the buoyancy of the buoyancy body 3 as a whole can also be more surely secured.

Figure 23:
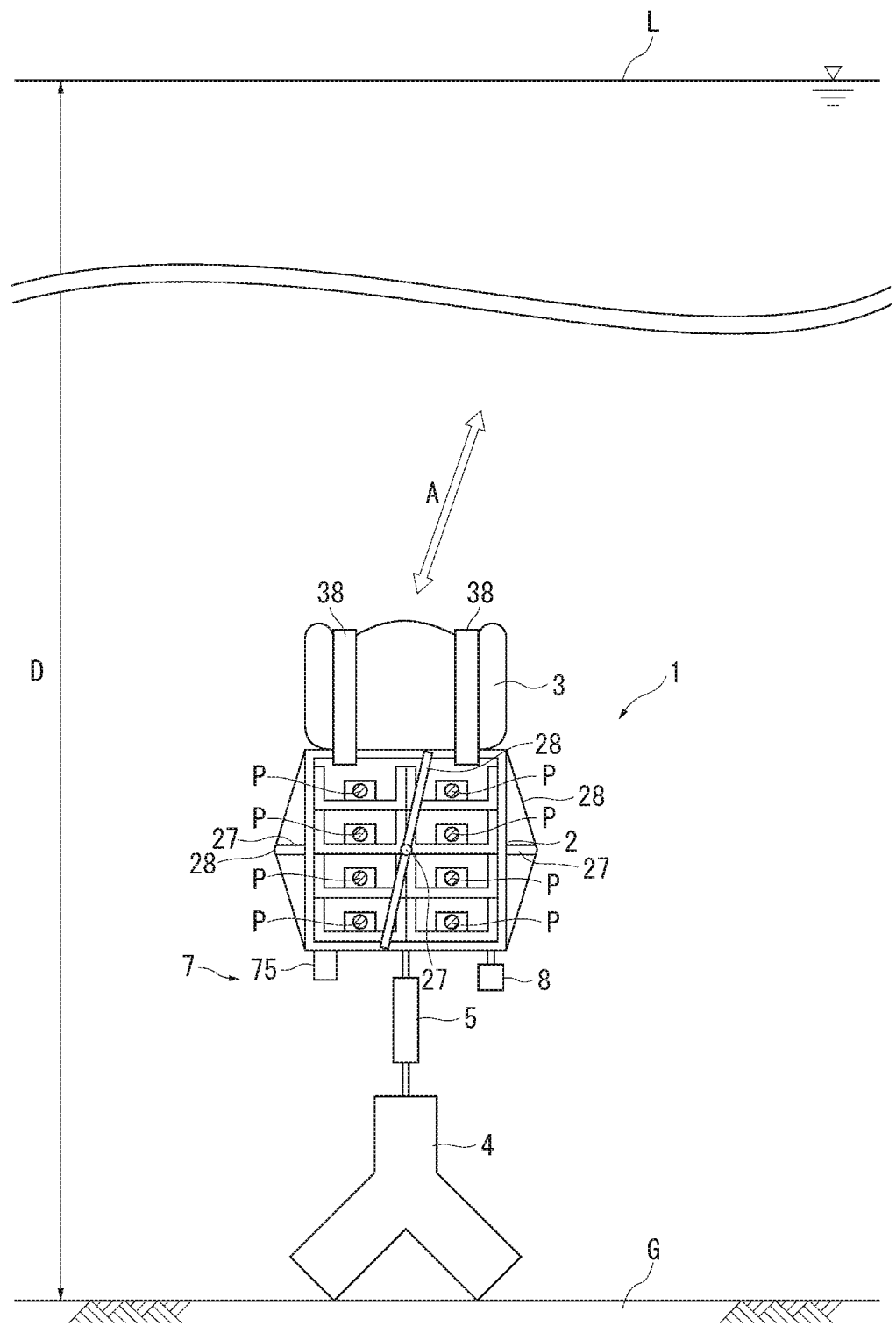
FIG. 23 is a schematic cross-sectional view illustrating a modification of the pressurization processing system 1 according to the first embodiment.

Next, a modification of the pressurization processing system 1 according to the first embodiment will be described. FIG. 23 is a schematic cross-sectional view illustrating the modification of the pressurization processing system 1 according to the first embodiment.

The buoyancy body 3 includes a connecting part 38 that is connected to the housing body 2 so that the buoyancy body 3 and the container 2 contact each other. The connecting part 38 uses a member such as a string and a rope, and is disposed so as to surround the upper side, the side surface side, and the lower side of the buoyancy body 3.

According to the modification, the buoyancy body 3 includes the connecting part 38 that is connected to the housing body 2 so that the buoyancy body 3 and the container 2 contact each other. Thus, the floating body 3 and the housing body 2 are in a state of contacting each other without being separated from each other, and the floating body 3 can be firmly fixed to the housing body 2. Therefore, when the pressurization processing system 1 is caused to settle or float, the pressurization processing system 1 can settle or float in a stable state.

The pressurization processing system 1 according to the modification further includes the fin 28 provided in the housing body 2, and an angle adjusting part 27 that adjusts an angle of the fin 28 in the vertical direction to an arbitrary angle.

The pressurization processing system 1 according to the modification further includes a control mechanism 7 provided in the housing body 2 and a camera 8. The control mechanism 7 includes an adjustment control part 75 that controls adjustment by the angle adjusting part 27. The adjustment control part 75 can communicate with the angle adjusting part 27 and transmits a signal for adjusting the angle of the fin 28 to the angle adjusting part 27. The angle adjusting part 27 adjusts the angle of the fin 28 based upon the signal transmitted from the adjustment control part 75.

The camera 8 can photograph an image of the surrounding environment. A user transmits and receives a signal for controlling the adjustment control part 75 of the control mechanism 7 from a controller communicable with the control mechanism 7 while viewing the image photographed by the camera 8. The user can grasp the state of the sea bottom G such as the presence or absence of the pressurization processing system 1 already immersed in the sea bottom G by the camera 8. The user can grasp the situation of the sea level such as the presence or absence of a ship floating on the sea level by the camera 8.

According to the modification, the pressurization processing system 1 further includes the fin 28 provided in the housing body 2, and the angle adjusting part 27 that adjusts the angle of the fin 28 in the vertical direction to an arbitrary angle. Thus, when the pressurization processing system 1 is caused to settle or float, a direction of the fin 28 can be controlled. Therefore, it is possible not only to control a direction in which the pressurization processing system 1 is caused to settle and float in a direction of an arrow A in the drawing, but also to adjust a position for settling and a position for floating.

In FIG. 23, as described above, the fin 28 and the angle adjusting part 27 are provided in the housing body 2, and in the present disclosure, the fin 28 and the angle adjusting part 27 may be also provided in the buoyancy body 3, the weight body 4, and the separation mechanism 5. At this time, it is desirable that the fin 28 and the angle adjusting part 27 are provided in the buoyancy body 3 and the separation mechanism 5. When the fin 28 and the angle adjusting part 27 are provided in the buoyancy body 3 and the separation mechanism 5, in the same manner as the case where the fin 28 and the angle adjusting part 27 are provided in the housing body 2, the direction of the fin 28 can be controlled when the pressurization processing system 1 is caused to settle or float. Therefore, it is possible to adjust the position where the pressurization processing system 1 is caused to settle or float.

Second Embodiment

Next, a pressurization processing system 1 according to a second embodiment will be described. As illustrated in FIG. 24A, the pressurization processing system 1 of the second embodiment is mainly different from that of the first embodiment in that the separation mechanism 5 is omitted and the weight body 4 uses a soluble body 41 that dissolves in seawater. Hereinafter, the description of the same configuration as that of the first embodiment will be appropriately omitted.

The weight body 4 is connected to the housing body 2, and uses the soluble body 41 that dissolves in the seawater. The soluble body 41 has water solubility and a predetermined shape. As the soluble body 41, for example, ice sugar, salt, biodegradable plastic having water solubility, and water-soluble adhesive are used.

Next, an example of the operation of the pressurization processing system 1 according to the embodiment will be described. FIGS. 24A and 24B are schematic views illustrating the pressurization processing system according to the second embodiment when settling in the sea. FIG. 24A is a schematic view illustrating the pressurization processing system according to the second embodiment on the water surface. FIG. 24B is a schematic view illustrating the pressurization processing system according to the second embodiment that settles in the sea.

As illustrated in FIG. 24A, the pressurization processing system 1 starts from a state of being transported to a predetermined position on the sea in advance by the ship 9 such as a marine vessel and a barge.

Next, as illustrated in FIG. 24B, the pressurization processing system 1 is caused to settle in the sea from the ship 9. At this time, since the apparent specific gravity of the whole body is greater than that of the seawater, the pressurization processing system 1 naturally settles toward the sea bottom G. As a result of the settling of the pressurization processing system 1 toward the sea bottom G, the pressurization processing system 1 is provided on the sea bottom G, and the target P is immersed at the predetermined water depth D of about 200 m to 10,000 m. Accordingly, the low temperature and the high pressure can be applied to the target P. Therefore, the pressurization processing system 1 can perform pressurization processing on the target P.

FIGS. 25A and 25B are schematic views illustrating the pressurization processing system according to the second embodiment when floating. FIG. 25A is a schematic view illustrating the pressurization processing system according to the second embodiment while floating, and FIG. 25B is a schematic view illustrating the pressurization processing system according to the second embodiment that has floated. After the lapse of a predetermined time, the soluble body 41 dissolves in seawater as illustrated in FIG. 25A. At this time, in the pressurization processing system 1, the apparent specific gravity of the whole body (mainly, the housing body 2, the buoyancy body 3, and the soluble body 41 that remains undissolved) is smaller than the specific gravity of the seawater. Therefore, the housing body 2 naturally floats in the seawater toward the sea level L (in a direction of an arrow U in the drawing) by the buoyancy of the buoyancy body 3.

As illustrated in FIG. 25B, the housing body 2 is caused to float on the sea level L, and the housing body 2 in which the target P is housed is collected by the ship 9. As described above, the pressurization processing of the target P by the pressurization processing system 1 is completed.

According to the embodiment, the pressurization processing system 1 includes: the housing body 2 for housing the target P; the buoyancy body 3 for causing the housing body 2 to float in the liquid; and the weight body 4 having the specific gravity greater than that of seawater. The weight body 4 is the soluble body 41 that dissolves in the seawater. Thus, when the soluble body 41 dissolves in the seawater, the housing body 2 naturally floats in the seawater by the buoyancy of the buoyancy body 3. Thus, the target P immersed in the seawater can be easily collected.

Third Embodiment

Next, a pressurization processing system 1 according to a third embodiment will be described. The pressurization processing system 1 of the third embodiment is mainly different from that of the first embodiment in that a thrust mechanism 6 and a control mechanism 7 are further included. Hereinafter, the description of the same configuration as that of the first embodiment will be appropriately omitted.

The thrust mechanism 6 generates thrust in water, and a rotatable motor screw is used. The thrust mechanism 6 can have any direction for generating the thrust, and a fin may be provided. The thrust mechanism 6 is provided in the housing body 2, and causes the housing body 2 to move by the thrust. The thrust mechanism 6 may be provided in the buoyancy body 3.

The control mechanism 7 includes a base point part 71, a base point position acquisition part 72, a target position acquisition part 73, and a control part 74.

The base point part 71 is provided near the sea surface, and for example, a buoy and a light buoy floating near the sea surface are used. The base point part 71 is provided with an anchor which is not illustrated, and fixed at a predetermined position on the sea. The base point part 71 may be connected to the weight body 4. The base point part 71 may be provided on the land of the coastal part.

The base point position acquisition part 72 acquires position information of the base point part 71. An electronic device capable of acquiring position information such as a global positioning system (GPS) is used for the base point position acquisition part 72. The base point position acquisition part 72 can transmit and receive information to and from other electronic devices, and transmits the acquired position information of the base point part 71 to the control part 74.

The target position acquisition part 73 acquires position information of the target P. An electronic device capable of acquiring the position information such as the GPS is used for the target position acquisition part 73. The target position acquisition part 73 is provided in the housing body 2 or the buoyancy body 3. The target position acquisition part 73 provided in the housing body 2 or the buoyancy body 3 acquires the position information of the target P. The base point position acquisition part 72 can transmit and receive the information to and from other electronic devices, and transmits the acquired position information of the target P to the control part 74.

The target position acquisition part 73 may measure a distance from a sound wave emitted to the base point part 71 to the base point part 71. The target position acquisition part 73 may acquire the position information of the target P based upon the measured distance up to the base point part 71 and the position information of the base point part 71 acquired by the base point position acquisition part 72.

The control part 74 controls the thrust mechanism 6 based upon the position information of the base point part 71 transmitted by the base point position acquisition part 72 and the position information of the target P transmitted by the target position acquisition part 73 so that the housing body 2 moves toward the base point part 71.

Next, an example of the operation of the third embodiment will be described.

The pressurization processing system 1 includes: the housing body 2 for housing the target P; the buoyancy body 3 for causing the housing body 2 to float in the liquid; the weight body 4 having the specific gravity greater than that of the seawater; and the separation mechanism 5 for separably connecting the housing body 2 and the weight body 4. Thus, the housing body 2 is separated from the weight body 4 by the separation mechanism 5, and naturally floats in the seawater by the buoyancy of the buoyancy body 3.

Figure 26:
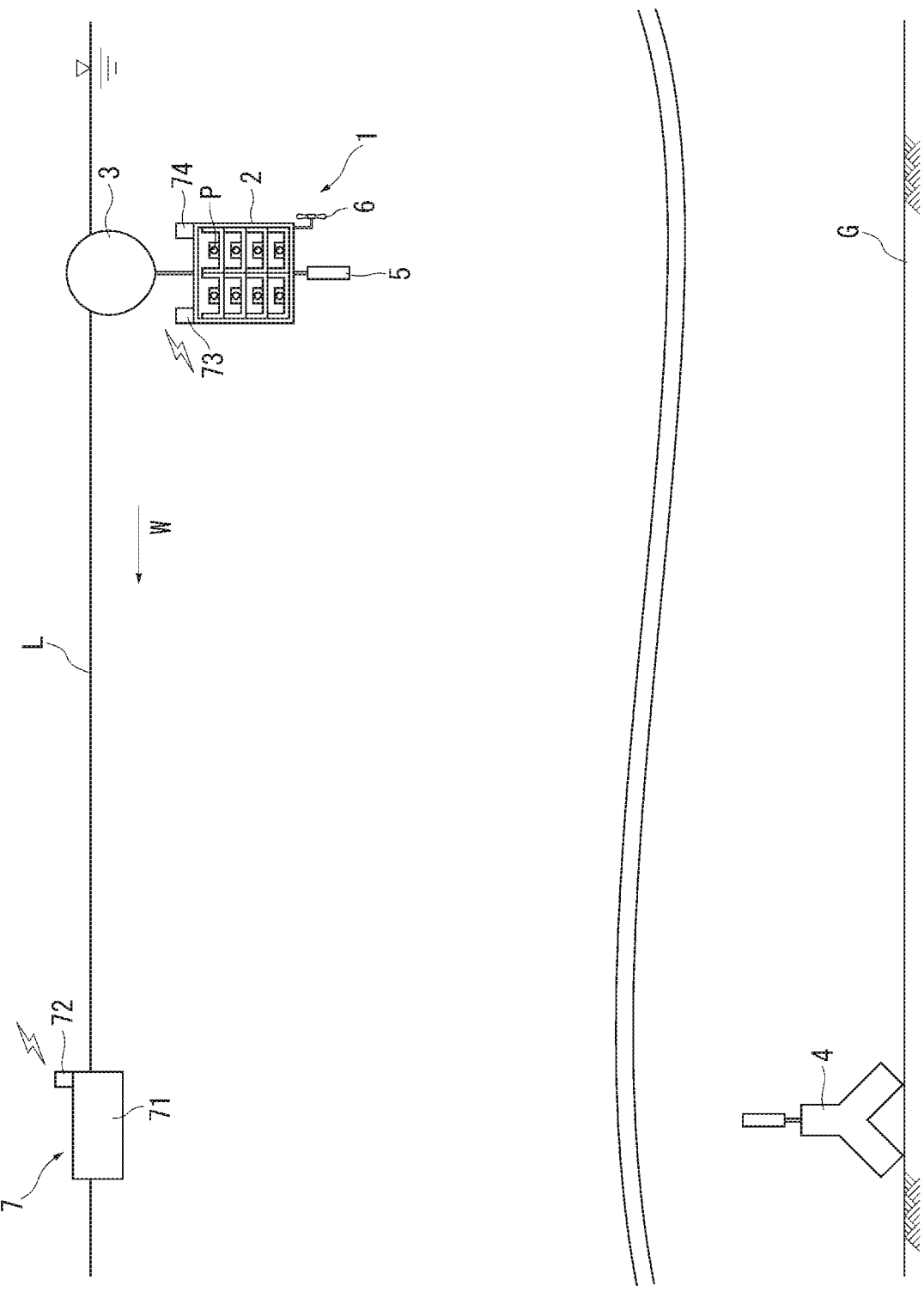
FIG. 26 is a schematic view illustrating the housing body that moves toward a base point part after the housing body is caused to float.

The housing body 2 and the weight body 4 are separated by the separation mechanism 5, and then the housing body 2 is caused to float up to the vicinity of the sea level L. At this time, as illustrated in FIG. 26, the housing body 2 may flow away by a sea current, and thus may float on the sea level L separated from the base point 71.

The control mechanism 7 acquires the position information of the base point part 71 by the base point position acquisition part 72 and the position information of the target P by the target position acquisition part 73. In the control mechanism 7, the control part 74 controls the thrust mechanism 6 based upon the position information of the base point part 71 transmitted by the base point position acquisition part 72 and the position information of the target P transmitted by the target position acquisition part 73 so that the housing body 2 moves toward the base point part 71. Thus, after the housing body 2 is caused to float, the housing body 2 can be caused to move to the base point part 71 in a direction of an arrow W in the drawing.

Figure 27:
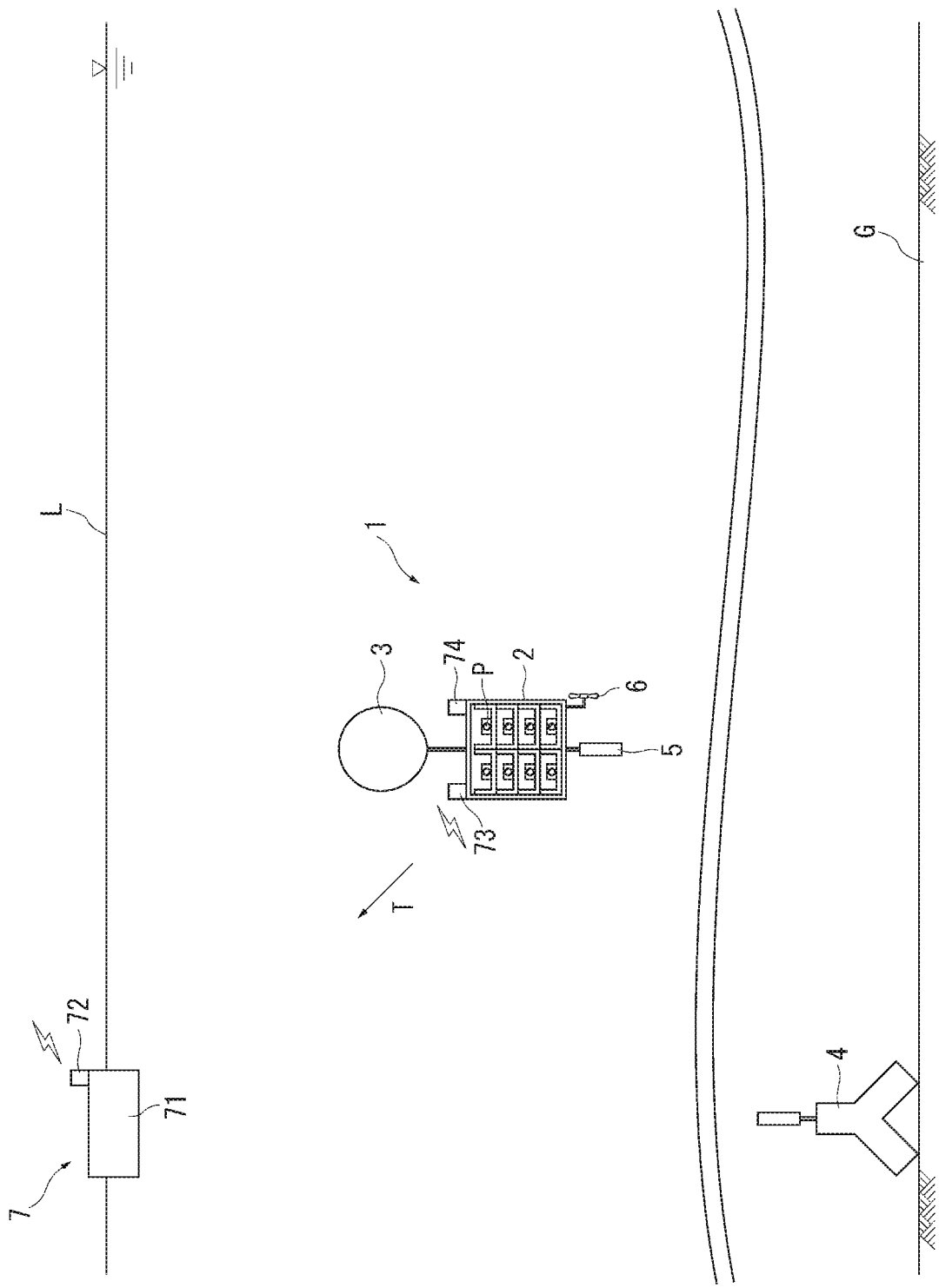
FIG. 27 is a schematic view illustrating the housing body that moves toward the base point part while the housing body is floating.

In the above-described example, the thrust mechanism 6 is controlled after the housing body 2 reaches the vicinity of the sea level L. In the present disclosure, the thrust mechanism 6 may be controlled while the housing body 2 is floating in the seawater as illustrated in FIG. 27. Accordingly, the housing body 2 can be caused to move to the base point part 71 in a direction of an arrow T in the drawing while the housing body 2 is floating, and thus the target P can be easily collected.

According to the embodiment, in the control mechanism 7, the control part 74 controls the thrust mechanism 6 based upon the position information of the base point part 71 transmitted by the base point position acquisition part 72 and the position information of the target P transmitted by the target position acquisition part 73 so that the housing body 2 moves toward the base point part 71. Thus, the housing body 2 can be caused to move to the base point part 71 in the direction of the arrow W in the drawing or in the direction of the arrow T in the drawing after the housing body 2 is caused to float or while the housing body 2 is floating. Therefore, even though the housing body 2 flows away due to the influence of the sea current, the target P can be easily collected without losing sight of the housing body 2.

Hereinabove, while examples of the embodiments of the present disclosure are described in detail, the above-described embodiments merely show specific examples in the implementation of the present disclosure, and the technical scope of the present disclosure should not be construed as being limited thereto.

What is claimed is:

1. A pressurization processing system that performs pressurization processing on a target by immersing the target in the sea or a lake, comprising:
    a housing body that is configured to house the target;
    a buoyancy body that is configured to float the housing body;
    a weight body that has a specific gravity greater than that of seawater or lake water; and
    a separation mechanism that separably connects the housing body and the weight body, wherein
    the buoyancy body includes a housing bag having water permeability, and
    the housing bag houses a plurality of hollow glass spheres, and is immersed in the seawater or the lake water so that a space between the plurality of hollow glass spheres housed in the housing bag is filled with the seawater or the lake water.

2. The pressurization processing system according to claim 1, wherein
    the buoyance body further includes an inner housing bag that is housed in the housing bag.

3. The pressurization processing system according to claim 1, wherein
   the separation mechanism includes a first metal member and a second metal member whose ionization tendency is lower than that of the first metal member,
   the first metal member includes a first mounting part on which the housing body is mounted and a second mounting part on which the weight body is mounted,
   a separation region is formed between the first mounting part and the second mounting part, and
   the second metal member is provided with a space between the separation region of the first metal member and the second metal member.

4. The pressurization processing system according to claim 1, wherein
   the separation mechanism includes a first metal member, a second metal member, and a power supply device that supplies electricity,
   the first metal member includes a first mounting part on which the housing body is mounted and a second mounting part on which the weight body is mounted,
   a separation region is formed between the first mounting part and the second mounting part,
   the second metal member is provided with a space between the separation region of the first metal member and the second metal member,
   the first metal member is electrically connected to a cathode side of the power supply device, and
   the second metal member is electrically connected to an anode side of the power supply device.

5. The pressurization processing system according to claim 1, wherein
   the separation mechanism includes a first member having a thermal melting property, a second member having an electrothermal property, and a power supply device that supplies electricity to the second member,
   the first member includes a first mounting part on which the housing body is mounted and a second mounting part on which the weight body is mounted,
   a separation region is formed between the first mounting part and the second mounting part, and
   the second member is provided in the separation region.

6. The pressurization processing system according to claim 1, wherein
   the buoyancy body includes a covering buffer material that covers the hollow glass sphere.

* * * * *